(12) United States Patent
Bando et al.

(10) Patent No.: US 6,332,039 B1
(45) Date of Patent: Dec. 18, 2001

(54) STRUCTURED DOCUMENT PREPARATION APPARATUS AND STRUCTURED DOCUMENT PREPARATION METHOD

(75) Inventors: Tatsuo Bando, Musashino; Shitashi Kato, Fujisawa; Hiroshi Okutomi, Tanashi; Kiyoshi Toyoda, Kunitachi, all of (JP)

(73) Assignee: Matsushita Graphic Communication Systems, Inc., Tokyo (JP)

( * ) Notice: Subject to any disclaimer, the term of this patent is extended or adjusted under 35 U.S.C. 154(b) by 0 days.

(21) Appl. No.: 09/269,172

(22) PCT Filed: Mar. 27, 1998

(86) PCT No.: PCT/JP98/01413

§ 371 Date: Mar. 24, 1999

§ 102(e) Date: Mar. 24, 1999

(87) PCT Pub. No.: WO99/08207

PCT Pub. Date: Feb. 18, 1999

(30) Foreign Application Priority Data

Aug. 7, 1997 (JP) .................................... 9-227098

(51) Int. Cl.$^7$ .............................. G06K 9/00; G06K 9/60; G06K 9/66; G06F 17/24
(52) U.S. Cl. ....................... 382/195; 382/181; 382/190; 382/305; 382/306; 707/501; 707/506; 707/509; 707/513
(58) Field of Search .................................. 382/181, 182, 382/185, 195, 276, 284, 287, 305, 306, 309, 190; 358/402, 403; 707/501, 506–509, 513

(56) References Cited

U.S. PATENT DOCUMENTS 5,044,802 * 9/1991 Sugiyama .............................. 400/695
5,181,162   1/1993 Smith et al. ......................... 707/530
5,572,625  11/1996 Raman et al. ....................... 704/260

(List continued on next page.)

FOREIGN PATENT DOCUMENTS

| 2273188 | 6/1994 | (GB) . |
| 61-62168 | 3/1986 | (JP) . |
| 4-321183 | 11/1992 | (JP) . |
| 7-262207 | 10/1995 | (JP) . |
| 7-271818 | 10/1995 | (JP) . |
| 8-204947 | 8/1996 | (JP) . |
| 9-44383 | 2/1997 | (JP) . |
| 9-50443 | 2/1997 | (JP) . |
| 9-91301 | 4/1997 | (JP) . |
| 9-146719 | 6/1997 | (JP) . |
| 9-163107 | 6/1997 | (JP) . |
| 96/34341 | 10/1996 | (WO) . |
| 97/22201 | 6/1997 | (WO) . |

OTHER PUBLICATIONS

Worring, et al "hyper document generation using OCR and Icon detection", IEEE, pp. 1183, 1995.*

(List continued on next page.)

Primary Examiner—Leo Boudreau
Assistant Examiner—Daniel G. Mariam
(74) Attorney, Agent, or Firm—Greenblum & Bernstein, P.L.C

(57) ABSTRACT

A plurality of documents including at least one symbol is scanned by a scanner section so as to be converted to image data. The symbol is recognized from image data by a symbol recognizing section. Next, a table creating section creates a link table in which the symbol included in one page is made to correspond to the other page having a common shaped symbol. A document creating section creates an HTML document using the link table based on an HTML. When the symbol of one page in the HTML document on a screen is clicked, an access to the other page can be obtained.

12 Claims, 37 Drawing Sheets

U.S. PATENT DOCUMENTS

| | | | |
|---|---|---|---|
| 5,692,073 | * 11/1997 | Cass | 382/219 |
| 5,708,825 | * 1/1998 | Sotomayor | 707/501 |
| 5,724,595 | * 3/1998 | Gentner | 707/501 |
| 5,757,468 | * 5/1998 | Patton et al. | 355/40 |
| 5,781,914 | * 7/1998 | Stork et al. | 707/506 |
| 5,838,906 | * 11/1998 | Doyle et al. | 709/202 |
| 5,870,552 | * 2/1999 | Dozier et al. | 709/219 |
| 5,881,233 | 3/1999 | Toyoda et al. | 709/233 |
| 5,911,145 | * 6/1999 | Arora et al. | 707/514 |
| 5,963,966 | * 10/1999 | Mitchell et al. | 707/513 |
| 6,045,048 | * 4/2000 | Wilz, Sr. et al. | 235/472.01 |
| 6,118,552 | * 9/2000 | Suzuki et al. | 358/432 |

OTHER PUBLICATIONS

Phelps et al "multivalent documents: inducing structure and behaviors in online digital documents", IEEE, pp. 144–152.*

Bacher "creating effective hypertext", IEEE, pp. 336–343, May 1996.*

English Language Abstract of JP–9–44383.

English Language Abstract of JP–7–262207.

English Language Abstract of JP–9–163107.

English Language Abstract of JP–9–91301.

English Language Abstract of JP–9–146719.

English Language Abstract of JP–9–50443.

English Language Abstract of JP–7–271818.

English Language Abstract of JP–4–321183.

English Language Abstract of JP–8–204947.

"Management of Multi–structured Hypermedia Documents: A Date Model, Query Language, and Indexing Scheme", Kyuchul Lee et al., Multimedial Tools and Applications, Mar. 1997, Kluwar Academic Publishers, Netherlands, vol. 4, No. 2, pp. 199–223, XP001001459, ISSN:1380–7501.

* cited by examiner

FIG. 3A

PAGE 1
- INTERNET ◎
- USAGE ●
- CATALOGUE ★

FIG. 3B

PAGE 2
- INTERNET ◎
- WHAT IS INTERNET · · ·
- INTRANET ◆

FIG. 3C

PAGE 3
- USAGE ●
- SIMILAR TO FACSIMILE
  · · ·

FIG. 3D

PAGE 4
- CATALOGUE ★
- FUNCTION · · ·
- PRICE · · ·

FIG. 3E

PAGE 5
- INTRANET ◆
- WHAT IS INTRANET · · ·

FIG. 6

| SYMBOL NUMBER | SYMBOL DATA |
|---|---|
| A | ◎ |
| B | ● |
|  |  |

FIG. 7

| SYMBOL | COLOR | NUMBER OF DOTS | SIZE |
|---|---|---|---|
| A | GREEN | 100 | 200 |
| B | WHITE | 150 | 300 |
|  |  |  |  |

FIG. 8A

IMAGE 00.GIF
- INTERNET  ◎ ● ★
- USAGE
- CATALOGUE

| PAGE | SYMBOL | ADDRESS | AREA | LINK DESTINATION |
|---|---|---|---|---|
| 1 | ◎ | a1, b1 | c1 | IMAGE 01.GIF |
| 1 | ● | a2, b2 | c1 | IMAGE 02.GIF |
| 1 | ★ | a3, b3 | c1 | IMAGE 03.GIF |
| | | | | |

FIG. 8B

IMAGE 01.GIF
- INTERNET  ◎ ◆
- WHAT IS INTERNET···
- INTRANET

| PAGE | SYMBOL | ADDRESS | AREA | LINK DESTINATION |
|---|---|---|---|---|
| 2 | ◆ | a4, b4 | c1 | IMAGE 04.GIF |
| | ○ | a5, b5 | c1 | IMAGE 00.GIF |
| | | | | |
| | | | | |

FIG. 8C

IMAGE 02.GIF
- USAGE  ●
- SIMILAR TO FACSIMILE
···

| PAGE | SYMBOL | ADDRESS | AREA | LINK DESTINATION |
|---|---|---|---|---|
| | ○ | a5, b5 | c1 | IMAGE 00.GIF |
| | | | | |
| | | | | |
| | | | | |

FIG. 8D

| PAGE | SYMBOL | ADDRESS | AREA | LINK DESTINATION |
|---|---|---|---|---|
|  | ○ | a5, b5 | c1 | IMAGE 00.GIF |
|  |  |  |  |  |

82

IMAGE 03.GIF
- CATALOGUE ★
- FUNCTION · · ·
- PRICE · · · ·

| PAGE | SYMBOL | ADDRESS | AREA | LINK DESTINATION |
|---|---|---|---|---|
|  | ○ | a5, b5 | c1 | IMAGE 00.GIF |
|  |  |  |  |  |

82

IMAGE 04.GIF
- INTRANET ◆
- WHAT IS INTRANET · ·

81

HOME 00.HTM

```
<HTML>
<HEAD>
<TITLE>INTERNET FAX</TITLE>
</HEAD>
<BODY>
<AHREF="FILE 00.MAP">
<IMG SRC="IMAGE 00.GIF ISMAP">
</BODY>
</HTML>
```

FIG. 12A

FILE 00.MAP

```
circle (a1,b1) c1 http://SITE-NAME/HOME01.HTM circle (a2,b2) c1 http://SITE-NAME/HOME02.HTM
circle (a3,b3) c1 http://SITE-NAME/HOME03.HTM
```

FIG. 12B

IMAGE 00.GIF

| · INTERNET | ◎ |
| · USAGE | ● |
| · CATALOGUE | ★ |

FIG. 12C

HOME 01.HTM

```
<HTML>
<HEAD>
<TITLE>INTERNET</TITLE>
</HEAD>
<BODY>
<AHREF="FILE 01.MAP">
<IMG SRC="IMAGE 01.GIF ISMAP">
</BODY>
</HTML>
```

FIG. 13A

FILE 01.MAP

```
circle (a4,b4) c1 http://SITE-NAME/HOME04.HTM
circle (a5,b5) c1 http://SITE-NAME/HOME00.HTM
```

FIG. 13B

IMAGE 01.GIF

- INTERNET ◎
- WHAT IS INTERNET · · · RADIUS C1
  ◆ (a4, b4)
- INTRANET RADIUS C1
  RETURN ○ (a5, b5)

FIG. 13C

HOME 02.HTM

```
<HTML>
<HEAD>
<TITLE>USAGE</TITLE>
</HEAD>
<BODY>
<AHREF="FILE 02.MAP">
<IMG SRC="IMAGE 02.GIF ISMAP">
</BODY>
</HTML>
```

FIG. 14A

FILE 02.MAP

```
circle (a5,b5) c1 http://SITE-NAME/HOME00.HTM
```

FIG. 14B

IMAGE 02.GIF

·USAGE                              ●

·SIMILAR TO FACSIMILE · · ·

RETURN    ○

FIG. 14C

HOME 03.HTM

```
<HTML>
<HEAD>
<TITLE>CATALOGUE</TITLE>
</HEAD>
<BODY>
<AHREF="FILE 03.MAP">
<IMG SRC="IMAGE 03.GIF ISMAP">
</BODY>
</HTML>
```

FIG. 15A

FILE 03.MAP

```
circle (a5,b5) c1 http://SITE-NAME/HOME00.HTM
```

FIG. 15B

IMAGE 03.GIF

- CATALOGUE  ★

- FUNCTION · · ·
- PRICE · · ·

RETURN  ○

FIG. 15C

HOME 04.HTM
```
<HTML>
<HEAD>
<TITLE>INTRANET</TITLE>
</HEAD>
<BODY>
<AHREF="FILE 04.MAP">
<IMG SRC="IMAGE 04.GIF ISMAP">
</BODY>
</HTML>
```
FIG. 16A
FILE 01.MAP
```
circle (a5,b5) c1 http://SITE-NAME/HOME00.HTM
```
FIG. 16B
IMAGE 04.GIF
·INTRANET                               
·WHAT IS INTRANET···
                         RETURN   
FIG. 16C

MANAZING TABLE OF FIRST TABLE

| COORDINATE | RADIUS | COLOR INFORMATION |
|---|---|---|
| 33. 35 | 11 | 1 |
| 35. 140 | 11 | 3 |
|  |  |  |
|  |  |  |

FIG. 27A

MANAZING TABLE OF SECOND TABLE

| COORDINATE | RADIUS | COLOR INFORMATION |
|---|---|---|
| 33. 35 | 10 | 1 |
| 34. 150 | 11 | 2 |
|  |  |  |
|  |  |  |

FIG. 27B

MANAZING TABLE OF THIRD TABLE

| COORDINATE | RADIUS | COLOR INFORMATION |
|---|---|---|
| 33. 35 | 11 | 2 |
|  |  |  |
|  |  |  |
|  |  |  |

FIG. 27C

MANAZING TABLE OF FOURTH TABLE

| COORDINATE | RADIUS | COLOR INFORMATION |
|---|---|---|
| 33. 35 | 11 | 3 |
|  |  |  |
|  |  |  |
|  |  |  |

CONTENT OF FILE OF FILE**.htm

```
1LINE  <HTML>
2      <HEAD>
3      <TITLE>TITLE**</TITLE>
4      </HEAD>
5      <BODY>
6      <IMG SRC="TITLE**.jpg" USEMAP="#TITLE**">
7      <MAP NAME="TITLE**">
8      <AREA SHAPE="CIRLE" COORDS="X,Y,R" HREF="TITLE**.htm">
9      <AREA SHAPE="DEFAULT" NOHREF>
10     </MAP>
11     <BR><A HREF="TITLE**.htm">to NEXT</A><BR>
12     </BODY>
13     </HTML>
```

- Line 3: TITLE** → NUMBER OF PAGES
- Line 6: TITLE**.jpg
- Line 8: X,Y,R → POSITION INFORMATION; "TITLE**.htm" → LINK INFORMATION
- Line 11: TITLE**.htm → n+1

CONTENT OF FILE OF FILE**.htm

| LINE | |
|---|---|
| 1 | <HTML> |
| 2 | <HEAD> |
| 3 | <TITLE>TITLE**</TITLE> |
| 4 | </HEAD> |
| 5 | <BODY> |
| 6 | <IMG SRC="TITLE**.jpg" USEMAP="#TITLE**"> |
| 7 | <MAP NAME="TITLE**"> |
| 8 | <AREA SHAPE="CIRLE" COORDS="*,*," HREF="TITLE.htm"> |
| 9 | <AREA SHAPE="DEFAULT" NOHREF> |
| 10 | </MAP> |
| 11 | <BR><A HREF="TITLE.htm">RETURN</A><BR>   → RETURN |
| 12 | </BODY> |
| 13 | </HTML> |

FIG. 37

| SYMBOL SHAPE | VOICE DATA FILE NAME |
|---|---|
| ♪ | MUSIC 01.WAV |
| 🎤 | SONG 01.WAV |
| 👄 | VOICE 01.WAV |
| ⋮ | ⋮ |

FIG. 38

| SYMBOL SHAPE | PAGE | ADDRESS | AREA | VOICE DATA FILE NAME |
|---|---|---|---|---|
| ♪ | 1 | $(X_1, Y_1)$ | r1 | MUSIC 01.WAV |
| 🎤 | 1<br>2 | $(X_2, Y_2)$<br>$(X_3, Y_3)$ | r2 | SONG 01.WAV |

STRUCTURED DOCUMENT PREPARATION APPARATUS AND STRUCTURED DOCUMENT PREPARATION METHOD

TECHNICAL FILED

The present invention relates to a structured document creating apparatus for creating a structured document to handle an original, that is, paper information, as an electronic document, and to a structured document creating method. Also, the present invention relates to a document creating apparatus with voice data for creating a document to which voice data is appended, and to a document creating method with voice data.

BACKGROUND ART

With recent developments in networks, typified by the Internet, information can be easily extracted from the network. In particular, by the structurization of information based on a HTML (Hypertext Markup Language) description used in the Internet, excellent browsers (application software for retrieving information) in the operability have become widespread. Due to this, in personal computers, there have been used various systems in which not only document information but also a voice and a moving video picture are structured and stored in an input apparatus. In this case, the structurization means to form a link structure or a hierarchical structure.

However, there exists information such as image data, which is difficult to be structured. In many cases, such information is handled as one batch file. A large amount of time must be required to structure the internal of the image.

Conventionally, for structuring the existing document described on paper, the document must be converted to characters by, for example, an optical character recognition (OCR) apparatus, or must be input from a keyboard. This requires the manpower in the operation. The existing document can be imaged by a scanner. However, there is a difficulty in dividing the image into some portions to be structured.

In recent years, there have become widespread information terminals e.g., personal computers, having a function of creating a document to which voice data is appended to link voice data to the document (hereinafter referred to as document with voice data).

The flow of the conventional procedure for creating the document with voice data will be explained with reference to FIG. 1.

FIG. 1 is a flowchart showing the flow of the conventional procedure for creating the document with voice data.

First of all, a document to which voice data should be appended is created by the input operation of the keyboard or the document is scanned by a scanning apparatus such as the scanner. Then, the document is displayed on a screen (S101).

Next, the display on the screen is changed to a voice symbol table, and a voice symbol linking to voice data is selected by a mouse clicking operation (S102).

Voice data, which is entered in the system in advance, can be used. Or, voice data newly input by a microphone can be used.

Next, the display on the screen is changed to the object image again, and the voice symbol is pasted to the document on the screen by dragging an icon of the displayed voice symbol using the mouse (S103).

If there are other voice symbols to be added, the operations in S102 to 103 are repeated (S104).

When the paste of all voice symbols to the object image is ended, the document with voice data is completed, and the document creating operation is ended.

In the conventional the apparatus for creating the document with voice data, however, an operator must repeat the operations in S102 to S103 by the number of times corresponding to the number of voice symbols to be added. Therefore, if a large number of voice symbols are present, it takes considerable time to complete the document with voice data.

DISCLOSURE OF INVENTION

In consideration of the above-mentioned problem, the present has been made, and a first object of the present invention is to easily structure a document as image data A second object of the present invention is to easily create a document with voice data for a short period of time even if a large number of voice symbols are present.

The present invention provides a structured document creating apparatus comprising:

an input section for inputting image data obtained by scanning an original including at least one symbol;

a symbol recognizing section for recognizing the symbol included in the image data;

a table creating section for creating a table in which specific data is made to correspond to the symbol; and a document creating section for creating a structured document described in an HTML in which the symbol is linked to the specific data based on the table.

In the present invention, the table creating section makes the symbol included in image data of a certain original correspond to image data of the other original including at least one symbol having an element common to the symbol included in image data of the certain original in connection with a plurality of originals.

Also, the structured document creating apparatus of the present invention may further comprises:

a symbol deleting section for deleting at least one symbol included in image data so as to be output; and a printing section for printing an output of the symbol deleting section.

Also, the structured document creating apparatus of the present invention may further comprises:

a symbol replacing section for replacing the symbol recognized by the symbol recognizing section with the other symbol stored in advance to correspond to the symbol recognized by the symbol recognizing section.

Also, in the structured document creating apparatus of the present invention, the document creating section may create the structured document in which the symbol having a specific meaning and a processing of the specific meaning are linked to each other, and an access to specific data linked to the symbol is obtained after the processing is performed when the symbol is activated.

Also, in the present invention, the symbol recognizing section recognizes the symbol in a predetermined area of an image file.

By the above-structured invention, the symbol recognizing section recognizes the symbol from the image obtained by scanning the original including the symbol. The table creating section creates the table in which specific data is made to correspond to the symbol. The document creating section creates the structured document described in the HTML in which the symbol is linked to the specific data based on the table. In the structured document, when the symbol is clicked, an access to the linked specific data can be obtained. The specific data includes, for example, image data of the original. In this case, when the symbol of a certain original is clicked, an access (jump) to image data of the other original is obtained, and the image data can be displayed. This can easily convert the existing document having the symbol formed by the stamp to the structured document.

Also, the present invention a structured document creating apparatus comprising:

an input section for inputting image data obtained by scanning an original;

a symbol adding section for adding at least one symbol to the image data:

a table creating section for creating a table in which specific data is made to correspond to the symbol; and a document creating section for creating a structured document described in an HTML in which the symbol is linked to the specific data based on the table.

By the above-structured invention, the symbol adding section adds the symbol to the image data obtained by scanning the original. The table creating section creates the table in which the specific data is made to correspond to the symbol. The document creates the structured document described in the HTML in which the symbol is linked to the specific data based on the table. This can easily convert the existing document to the structured document.

The structured document creating apparatus of the present invention may comprise a display section for displaying input image data. By this structure, the symbol can be added as confirming the content of the image data by use of the display section.

Also, the present invention provides a communication apparatus comprising:

an input section for inputting image data obtained by scanning an original including at least one symbol;

a symbol recognizing section for recognizing the symbol included in the image data;

a table creating section for creating a table in which specific data is made to correspond to the symbol;

a document creating section for creating a structured document described in an HTML in which the symbol is linked to the specific data based on the table; and a transmitting section for transmitting the structured document.

Also, the present invention provides a communication apparatus comprising:

an input section for inputting image data obtained by scanning an original;

a symbol adding section for adding at least one symbol to the image data:

a table creating section for creating a table in which specific data is made to correspond to the symbol;

a document creating section for creating a structured document described in an HTML in which the symbol is linked to the specific data based on the table; and a transmitting section for transmitting the structured document.

Also, the present invention provides a structured document creating method comprising the steps of:

recognizing at least one symbol included in image data obtained by scanning an original including at least one symbol;

creating a table in which specific data is made to correspond to the symbol; and creating a structured document described in an HTML in which the symbol is linked to the specific data based on the table.

Also, the present invention provides an apparatus for creating a document with voice data comprising:

an input section for inputting image data obtained by scanning an original with at least one voice symbol;

a recognizing section for recognizing the voice symbol from the image data;

a voice storing section for storing voice data; and a table creating section for creating a table in which the recognized voice symbol is made to correspond to the stored voice data.

By the above-mentioned invention, the document with voice data can be created from the original to which the voice symbol is added in advance. For this reason, even if the large number of voice symbols is present, all voice symbols can be easily added for a short period of time.

In the present invention, the table creating section may make a different voice symbol correspond to voice data for each kind. By this structure, the user can visually determine the kind of voice data from the shape of the voice symbol.

Also, the present invention provides a method for creating a document with voice data comprising the steps of:

scanning an original with at lease one voice symbol; and recognizing the voice symbol from the scanned document, wherein when the recognized symbol and voice data are linked to each other and the voice symbol on a screen is selected, the document with voice data to be reproduced is created.

BRIEF DESCRIPTION OF DRAWINGS

FIGS. 3A to 3E are views each showing a sample of the document common to the first to third embodiments of the present invention;

FIG. 6 is a view showing the symbol table used when a shape of the symbol is recognized according to the first embodiment of the present invention;

FIG. 7 is a view showing the symbol table used when a color of the symbol is recognized according to the first embodiment of the present invention;

FIGS. 8A to 8E are views each showing the link table corresponding to each page of the document according to the first embodiment of the present invention;

FIGS. 12A to 12C are views each showing a file, which is structured with respect to a first page of the original according to the first embodiment of the present invention;

FIGS. 13A to 13C are views each showing a file, which is structured with respect to a second page of the original according to the first embodiment of the present invention;

FIGS. 14A to 14C are views each showing a file, which is structured with respect to a third page of the original according to the first embodiment of the present invention;

FIGS. 15A to 15C are views each showing a file, which is structured with respect to a fourth page of the original according to the first embodiment of the present invention;

FIGS. 16A to 16C are views each showing a file, which is structured with respect to a fifth page of the original according to the first embodiment of the present invention;

FIGS. 27A to 27D are views each showing a managing table of each page of the original according to the second embodiment of the present invention;

FIGS. 31 and 32 are views each showing the HTML file to be generated in the second embodiment of the present invention;

FIG. 37 is a view showing the symbol table in a symbol table storing section according to the fifth embodiment of the present invention;

FIG. 38 is a view showing the link table in a link table storing section according to the fifth embodiment of the present invention;

BEST MODE FOR CARRYING OUT THE INVENTION

Embodiments of the present invention will be specifically described with reference to the drawings.

Figure 1:
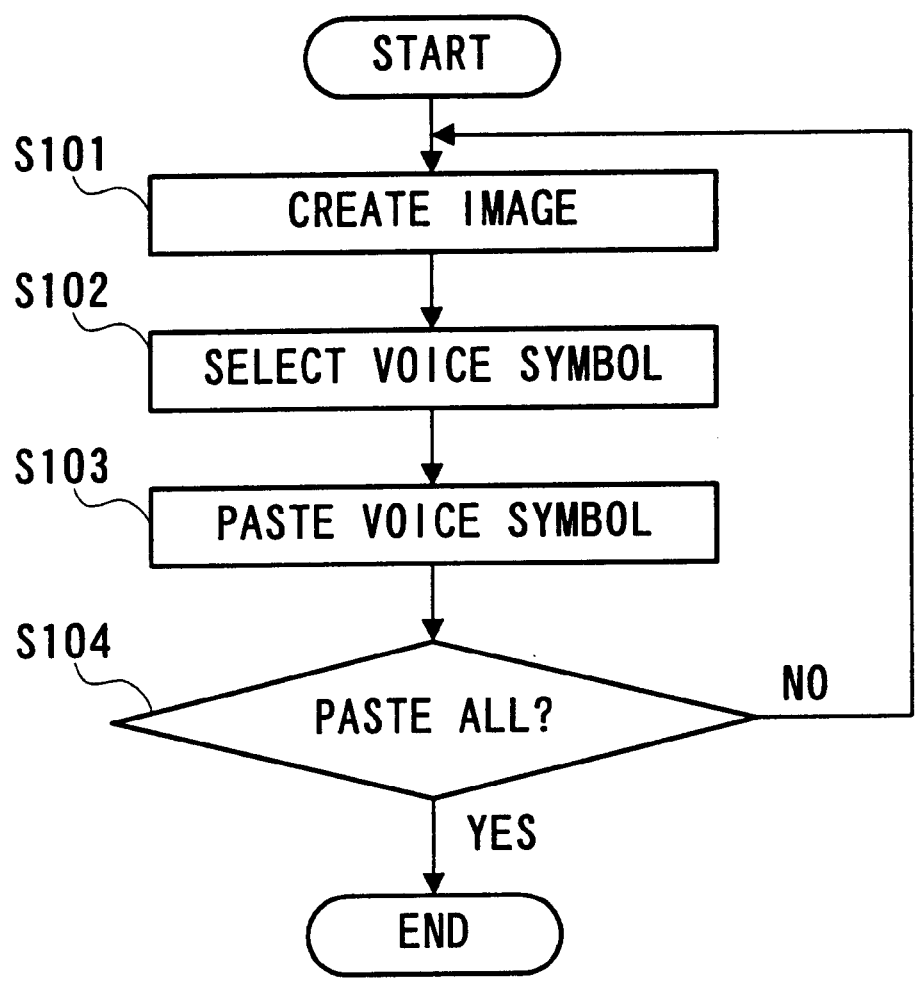
FIG. 1 is a flowchart showing the flow of the conventional procedure for creating a document with voice data.
Figure 2:
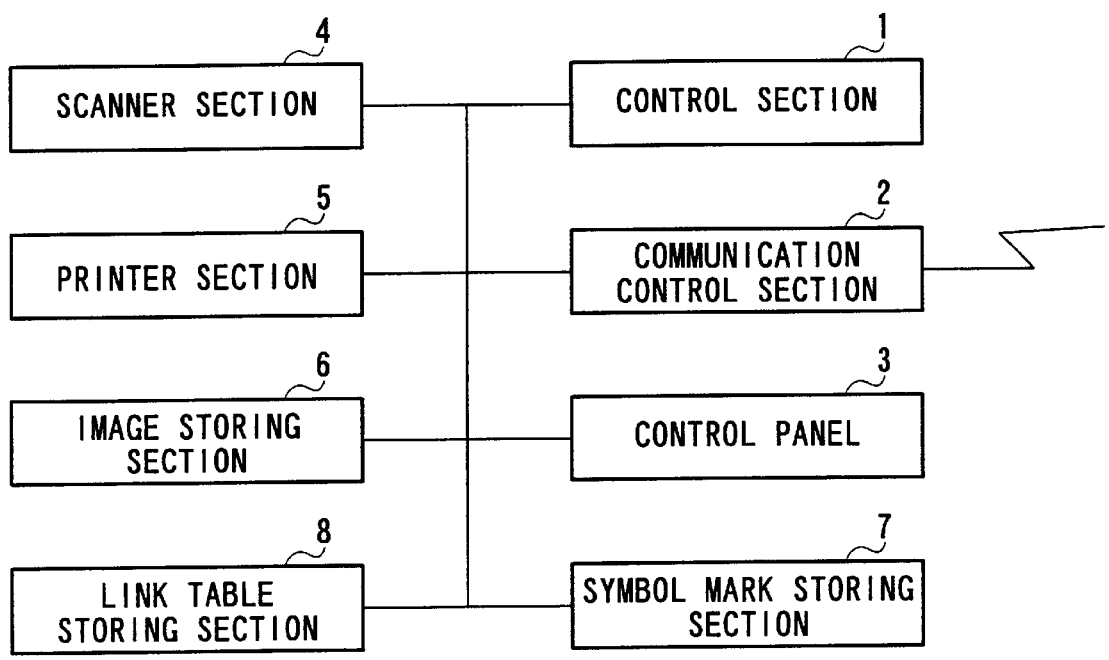
FIG. 2 is a block diagram of an apparatus common to first to third embodiments of the present invention.

FIG. 2 is the block diagram of the structured document creating apparatus according to the first to fourth embodiment of the present invention. A control section 1 controls the entire apparatus. The control section 1 performs the recognition of a symbol to be described later, a creation of a link table, and a creation of a structured document.

A communication control section 2 connects to a telephone line, etc., and controls facsimile communications and communications with a computer network such as Internet. A control panel 3 has touch keys and a display panel, and displays the input of data, input data, and outputting data.

A scanner 4 scans an original, and outputs image data. The image data is input to the control section 1, and the processing such as a symbol recognition is performed.

A printer 5 prints received data and data scanned by the scanner 4.

A symbol storing section 7 stores received facsimile data and a symbol displayed in data input from the scanner 4.

A link table storing section 8 stores a table describing a symbol displayed on each page of image data of the original, its position, and a page linking to the symbol.

FIGS. 3A to 3E are views each showing a sample of the original used in common to the first to third embodiments of the present invention. The original has five pages, and the first page is used as a table of contents. Symbols (marks) ☉,●, ★ are described for each of items, that is, "Internet", "Usage", "Catalogue" in the table. On the second page, the title "Internet", its symbol☉, the explanation of Internet, and a display of an "Intranet" and its symbol ♦ are described. On the third page, the title "Usage", its symbol ●, and its explanation are described. The fourth page has substantially the same form as the third page. On the fifth page, the title "Intranet" and its symbol ♦, and its explanation are described. Thus, the same symbol is added to the page showing the title and the page showing the content of the title, respectively.

Figure 4:
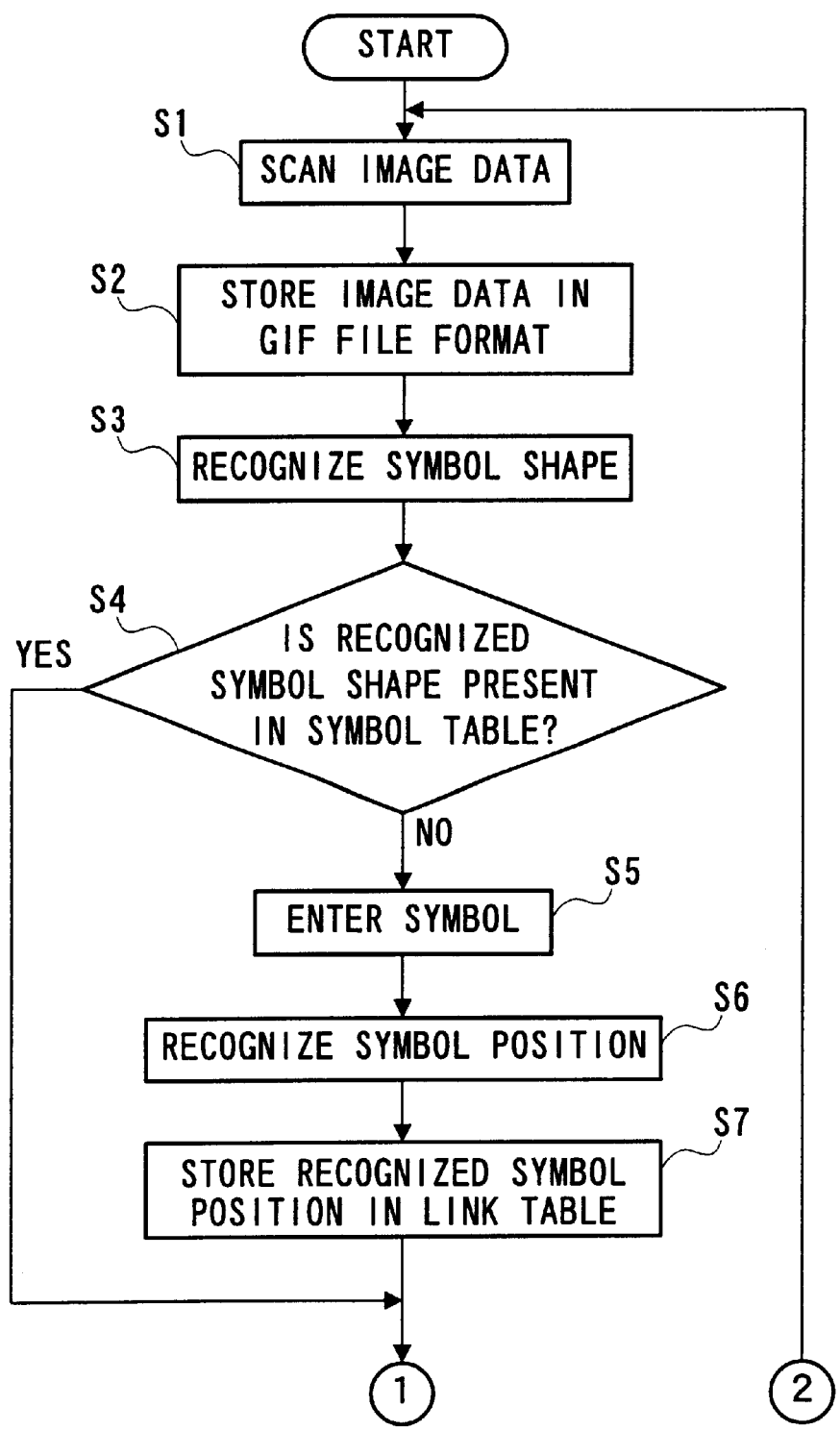
FIG. 4 is a flowchart showing an operation in creating a symbol table and a link table according to the first embodiment of the present invention.
Figure 5:
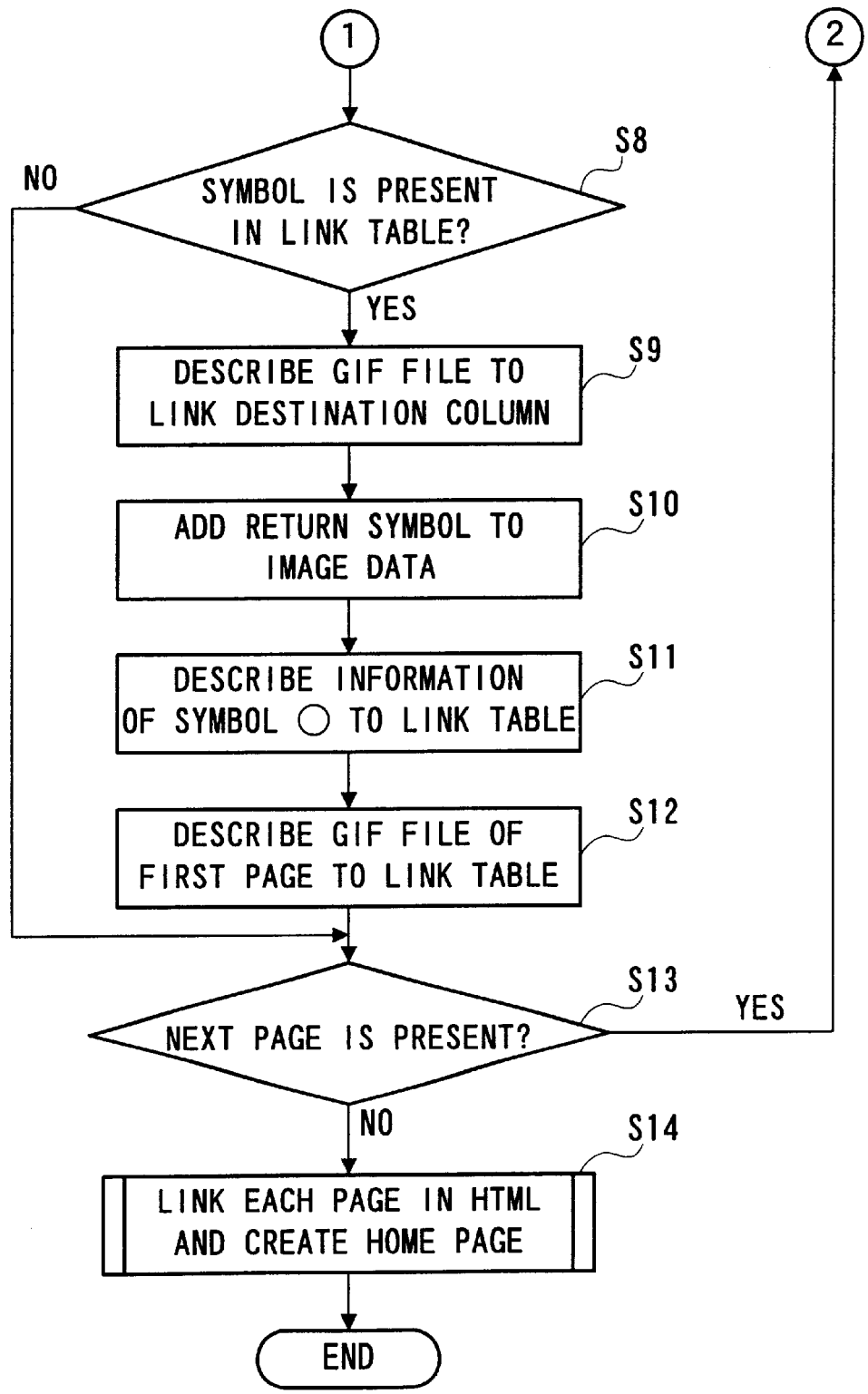
FIG. 5 is a flowchart continued from the flowchart of FIG. 4.

The first embodiment of the present invention will be explained. FIGS. 4 and 5 are flowcharts each showing the operation of the symbol table creation and that of the link table creation. The original having five pages shown in FIGS. 3A to 3E is scanned by the scanner 4 (S1), and image data is stored in the image storing section 6 in a GIF file form (S2). It should be noted that the GIF file form is a format for an image file having a size, which is useful for communications.

Next, among symbol elements, the shape is recognized in S3. FIG. 6 shows the symbol table. The symbol table is stored in the symbol storing section 7.

The symbol elements widely include shapes, colors, sizes, kinds of lines, kinds of painted-out symbols, and light and shade or lightness.

FIG. 7 shows a case of recognizing the color, which is the other element of the symbol. In the case of recognizing the symbol using the color, the symbol is expressed by the color of the symbol, the number of dots, and the size. Both the color and the shape may be recognized such that they are related to each other in terms of the combinations.

In S4, it is determined whether or not the recognized symbol is entered in the symbol table. If the recognized symbol is not entered in the symbol table, the symbol is entered in S5. If the recognized symbol is entered in the symbol table, the operation goes to S8 shown in FIG. 8.

In S6, the position of the symbol is recognized. Various methods for displaying the position of the symbol are present. In the first embodiment, the position of the symbol is expressed by a central coordinate of the symbol and a radius, which is used when a circle having a size enough to place the symbol therein is drawn around the central coordinate.

In S7, the recognized symbol position is stored in the link table. The link table is a table that shows the symbol and data of the page linked by the symbol. FIGS. 8A to 8E show each page of the original and the link table corresponding to each page. FIGS. 8A to 8E show the first to fifth pages in order.

In FIG. 8A, 81 means image data of the first page of the original stored in a file IMAGE00.GIF. Image data of the original is stored in one file for each page. IMAGE00.GIF to IMAGE04.GIF are given as a file name in order of the first to fifth pages. A link table 82 is created to correspond to image data 81 of each page, and is stored in the link table storing section 8. In the link table 82, columns, that is, page, symbol, address, area, and link destination, are provided. In a case where a symbol appears on one page for the first time counting from the first page in order, the page where the symbol appeared is stored in the page column. In the case of the first page, since three symbols appear for the first time, the first page is stored in the page column and three symbols are stored in the symbol column. The address column indicates the central coordinate of the symbol and the area column indicates the radius of the circle described to enclose the symbol around the central coordinate of the symbol. In the link designation column, the file name of the page where the same symbol has appeared is stored.

In the link table on the second page, data of the symbol ♦ appeared for the first time on the second page is stored. Moreover, data of the symbol ○ is stored therein. The symbol ○ is one that is added to image data of the second to fifth pages to return to the first page to be described later. In the address destination column, the file name of the first page is stored. On the third to fifth pages, since there is no symbol appearing for the first time, only the return symbol is stored. In other words, the third to fifth pages have the same data. Thus, in the link table on the first page, data excepting the link destination is stored.

In S8 shown in FIG. 5, it is determined whether or not there is any symbol in the link table 82 stored in the link table storing section 8. Regarding the first page, since there is no previous page and no symbol in the link table 82, the operation goes to S13.

Regarding the second page, the symbol ◎ is present in the link table 82 of the first page shown in FIG. 8A. Therefore, in S9, the file name, IMAGE01.GIF, which is the image data of the second page, is stored in the link destination column.

Regarding the third and fourth pages, the symbols ●, ★ are present in the link table 82 of the first page shown in FIG. 8A. Therefore, in S9, the file names, IMAGE02.GIF, IMAGE02.GIF, which are the image data of the third and fourth pages, are stored in the link destination column, respectively.

Regarding the fifth page, the symbol ♦ is present in the link table 82 of the first page shown in FIG. 8B. Therefore, in S9, the file name, IMAGE05.GIF, which is the image data of the fifth page, is stored in the link destination column.

In S10, to return to the first page at the second page and the subsequent pages, the return symbol ○ is added to a predetermined position of image data. Then, in S11, information of the return symbol ○ is stored in the self link table 82. Namely, the central coordinate of the return symbol ○ is stored in the address column and data of the radius is stored in the area column. In S12, the file name IMAGE00.GIF is stored in the link destination column. It should be noted that the processing for adding the return symbol ○ to image data is performed in the HTML creation processing to be described later. Then, the creation of the symbol table and that of the link table are ended.

In S13, it is determined whether or not a next page is present. If the next page is present, the operation goes back to S1. If the next page is not present, in S14, a structured document linking to each page of the original is created in the HTML form using created data.

Figure 9:
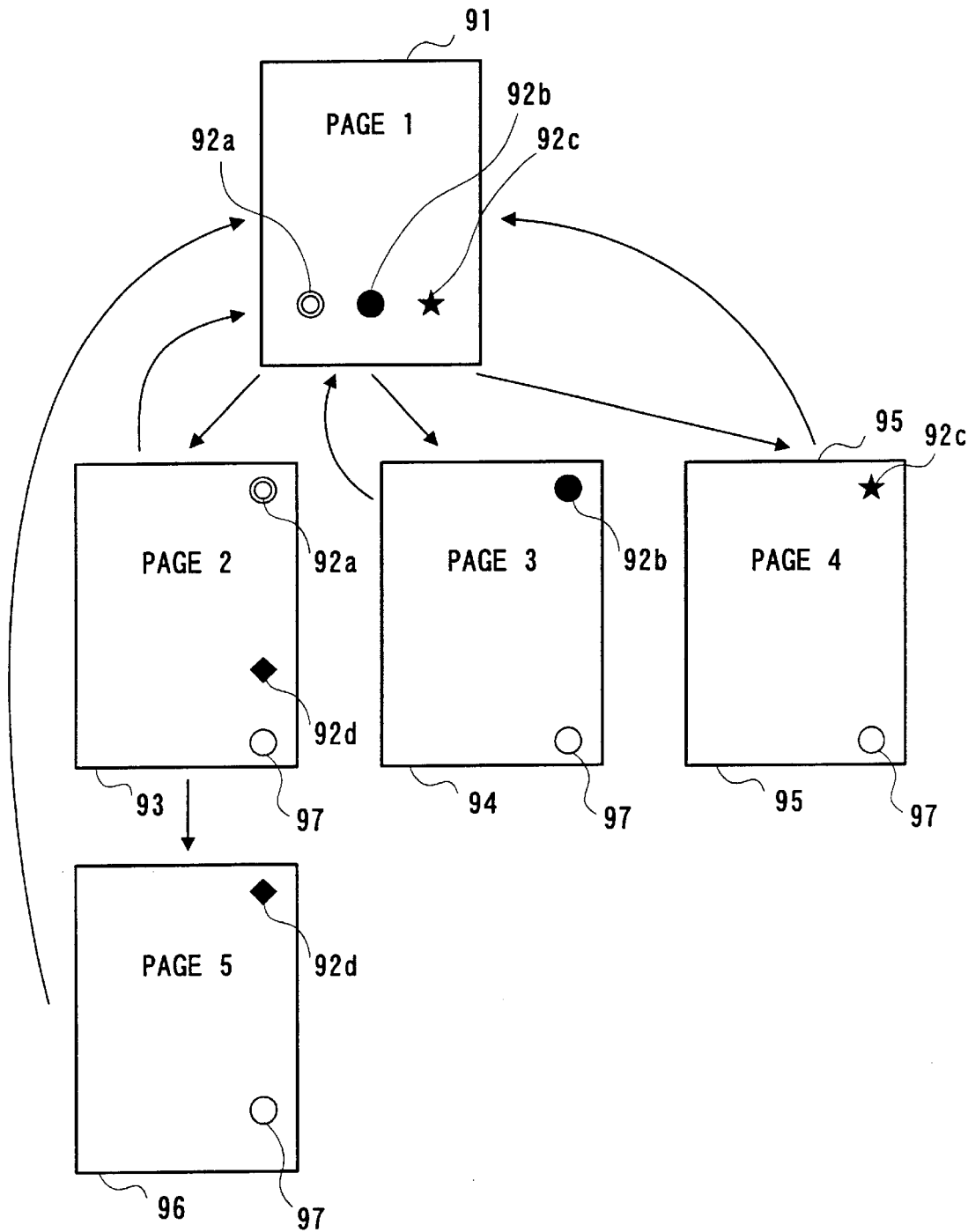
FIG. 9 is a view showing the relationship between the respective pages linked by the symbol according to the first embodiment of the present invention.

FIG. 9 is a view showing the relationship between the respective pages linked by the symbols. The second to fourth pages 93 to 95 are linked to the first page 91 by symbols ◎92a, ●92b, ★92c displayed on the first page. Then, the fifth page 96 is linked to the second page 93 by the symbol ♦92d displayed on the second page 92. Also, a return symbol ○97 for returning to the first page 91 is provided in the second to fifth pages. This activates the symbols ◎92a, ●92b, ★92c of the first page 91 displayed on the browser, so that an access to the files of the second to fourth pages 93 to 96, corresponding to the respective symbols, can be obtained. In this case, "access" means jumping to the link destination. Then, "link destination" widely includes data such as a program file linked to the symbol, a document file, a text file, an image file, and a moving video picture file. Moreover, "activate" indicates as follows. Specifically, the symbol is designated on browser, and the designated symbol is clicked so as to download the link destination. Then, the content of the downloaded link destination is displayed and the problem is executed.

Similarly, the symbol ♦92d of the second page 93 is clicked so that an access to the file of the fifth page 96 can be obtained. The return symbol ○97 of each of the second to fifth pages 93 to 96 is clicked, so that an operation for returning to the first page 91 is executed.

Figure 10:
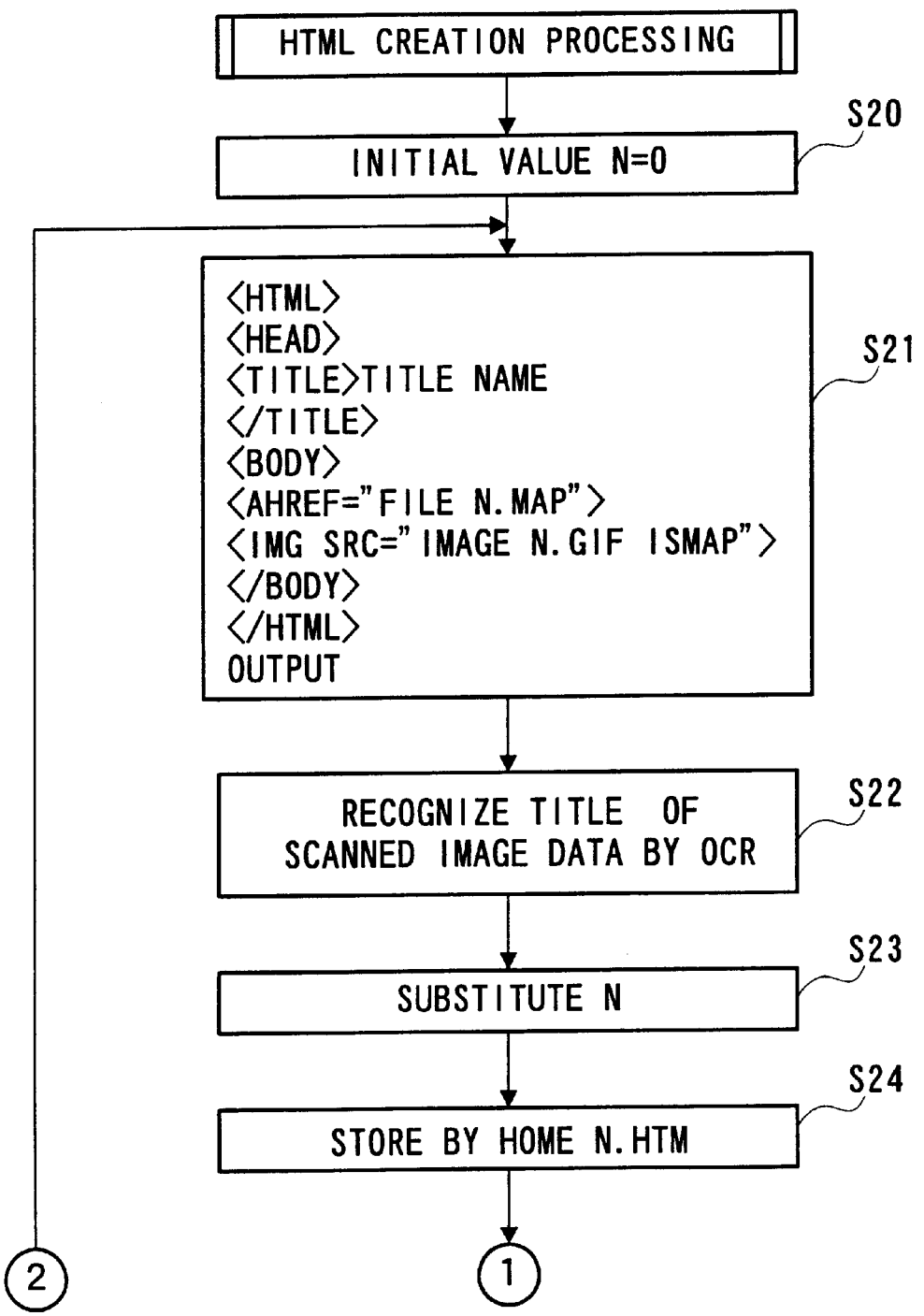
FIG. 10 is a flowchart showing an operation of an HTML creation processing according to the first embodiment of the present invention.
Figure 11:
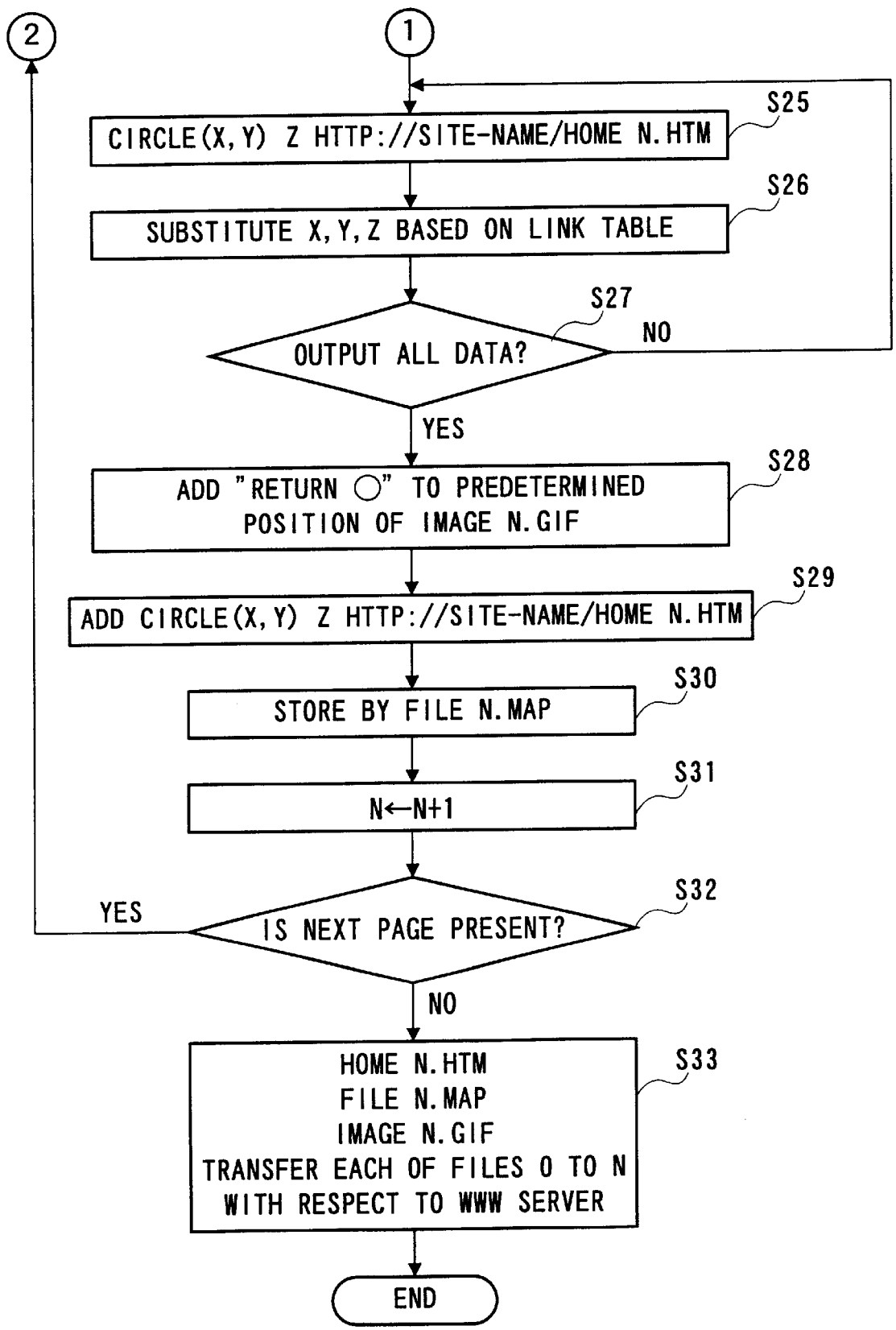
FIG. 11 is a flowchart continued from the flowchart of FIG. 10.

FIGS. 10 and 11 are flowcharts each showing the operation of the HTML creation processing shown in FIG. 5. In the HTML, there is a program such as a clickable map. The clickable map is that a linkable area is set in various portions of the image such that an access to a plurality of files from one image can be obtained. This can be displayed as follows:

<A HREF="MAP FILE NAME. MAP">

<IMG SRC="IMAGE FILE NAME. GIF ISMAP"     (1)

In this case, the "IMAGE FILE. GIF" is created for each page at the time of scanning the original by the scanner 4 as shown in FIGS. 8A to 8E. However, the return symbol ○97 is not yet added. Then, "MAP FILE. MAP" is an HTML file for the position of the symbol, which is stored in the link table of each page shown in FIGS. 8A to 8E, and the page corresponding to the symbol. Namely, "MAP FILE. MAP" is the file indicating the structured document shown by equation (1), and an extension .HTML or (.HTML) is added to the file. In this embodiment, the MAP FILE. MAP is set to FILE00.MAP to FILE04.MP, the HTML file is set to HOME00.HTML to HOME04.HTML. It should be noted that the IMAGE FILE NAME. GIF is already created as IMAGE00.GIF to IMAGE04.GIF.

FIGS. 9 and 10 are flowcharts each showing that a HOMEN.HTM file is created for each page. N is a value, which is shown on behalf of numbers 00 to 04, which are added to the respective files for each page. First of all, an initial value is set to N=0 and HOME00.HTML of the first page is created (S20). Step 21 shows a standard of the HOME file. Then, if the name of title and the value of N of each of FILEN.MAP and IMAGEN.GIF are substituted, the HOME. HIT file for each page is completed. The standard structured document that is shown in step S21 is a simple program, which expresses the name of title and equation (1) by HTML. Namely, <HTML> and <HTML> are placed at both ends, respectively, and <HEAD> is described to display the title. Then, the name of the title is sandwiched between <TITLE> and <TITLE>. Next, equation (1) is sandwiched between <BODY> and <BODY>.

Image data obtained by scanning the first page of the original is recognized by the OCR apparatus so as to be set as a name of title. In this case, the name of title is set to "INTERNET FAX" (S22). N of each of FILEN. MAP and IMAGEN. MAP is set to 00 (S23). The file thus completed is stored by a file name, that is, HOM00. HTML (ST23). Specifically, HOME00. HTML shown in FIG. 12A is a file created in such a manner.

In FIG. 11, the symbols of page 1 displayed in step S25 indicate the coordinate of each symbol, the radius, and the location of HOME. HTML file of the page linking to each symbol. More specifically, marks X and Y are the coordinate of the symbol, Z is the radius of the circle enclosing the symbol. Then, HTTP is an abbreviation of a hypertext transfer protocol, and a file continuing thereto is a file for a WWW server. Moreover, SITE-NAME shows a site name of the WWW server for transferring a completed file to be described later. Namely, the HOME. HTML file is stored in the site. The substitution of X, Y, S of each symbol and that of N=00 are performed (S26). These substitutions are performed with respective to three symbols of the first page (S27). A FILE00.MAP shown in FIG. 12B is a file created in this manner. Then, IMAGE00.GIF shown in FIG. 12C is image data obtained by scanning the first page by the scanner 4. The completion of three files shown in FIGS. 12A to 12C results in the completion of the structured document of the first page.

In the case of the second to fifth pages, the return symbol "○" for returning to the first page is added to image data stored in the IMAGE.GIF file of each page (S28). IMAGE01. GIF shown in FIG. 13C shows a state in which the return symbol "○" is added to image data. The central coordinate of the return symbol "○" is shown by (a5, b5), and the cycle with a radius C1 enclosing the return symbol "○" is shown by a broken line. The symbol ♦ of the intranet and the central coordinate (a4, b4), and the radium C1 are also shown. The file name HOME00.HTML where the return symbol "○" should be returned is shown. The display of step S29 is added. This completes FILE01. MAP in the case of the second page, and the file is stored by this name (S280). FIG. 13B shows FILE01. MAP. The completion of three files of FIGS. 13A to 13C results in the completion of the structured document of the second page. If the second page is ended, N=2 is set and the operation goes to the third page (S281), and the similar processing is performed up to the fifth page. FIGS. 14A to 14C show the structured document of the third page, and FIGS. 15A to 15C show the structured document of the fourth page. Then, FIGS. 16A to 16C show the structured document of the fifth page. Three files of each page thus created, that is, HOMEN. HTM, FILEN. MAP, IMAGEN. GIF are transferred to the WWW server (S283).

Next, a symbol adding method will be explained.

Figure 17:
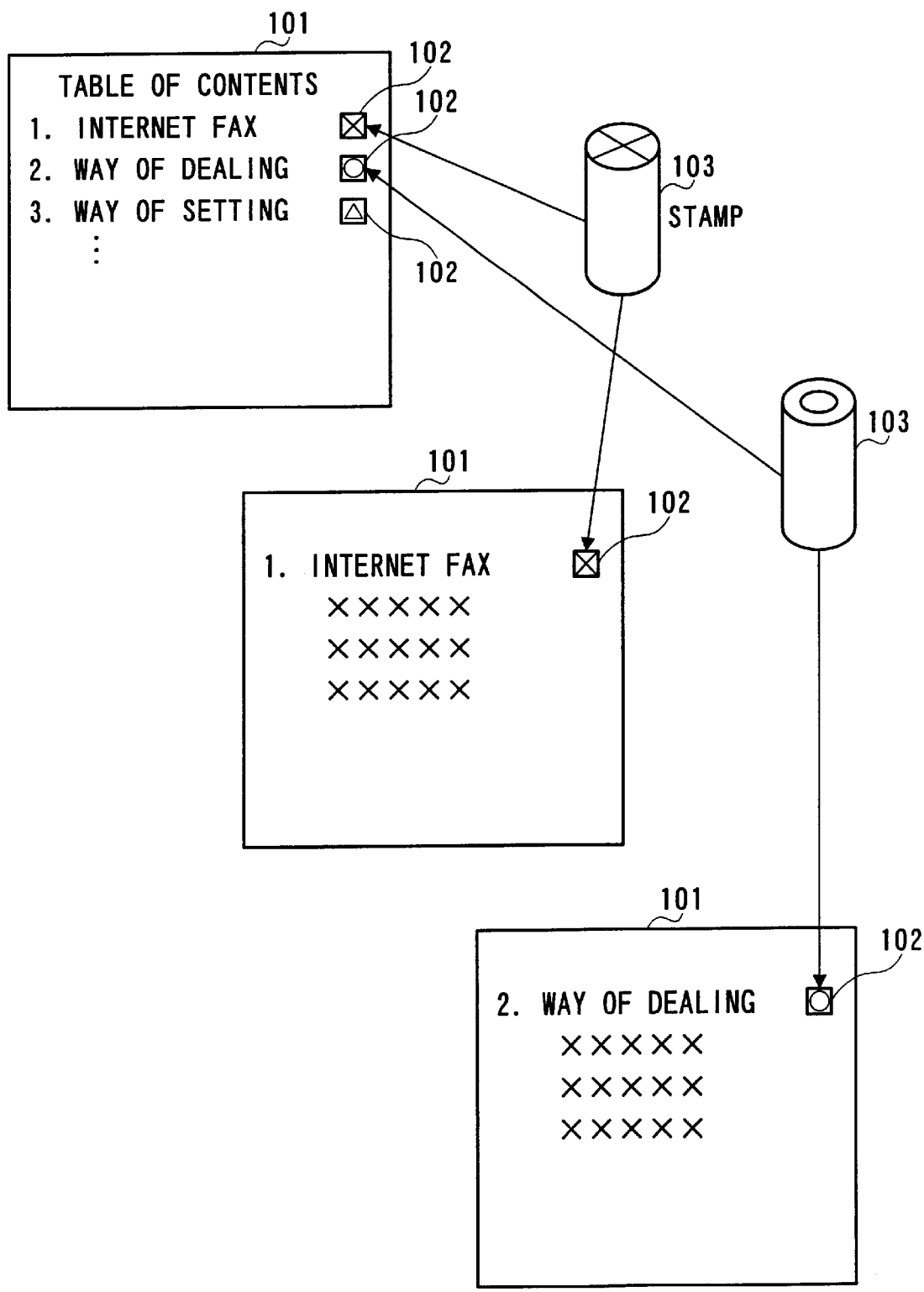
FIG. 17 is a view showing a method f or displaying a symbol with a stamp according to the first embodiment of the present invention.

FIG. 17 shows a case in which a symbol 102 is pressed onto each page of an original 101 by a stamp 103. In this case, ink disappearing after a fixed lapse of time is useful as stamp ink to keep the original from becoming dirty. In place of the stamp 103, a seal showing the symbol may be pasted. Then, the seal is peeled out after being scanned by the scanner.

Figure 18:
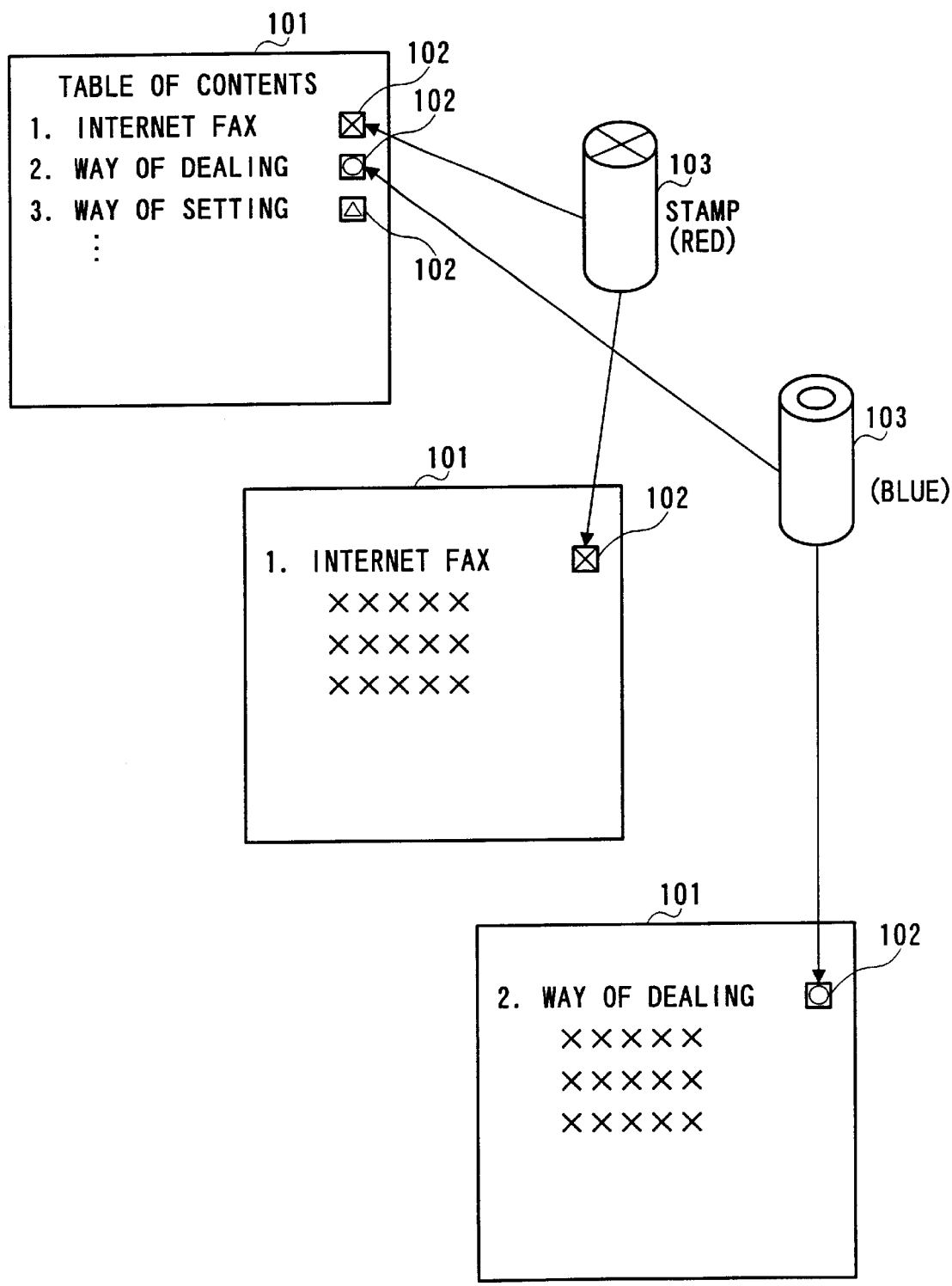
FIG. 18 is a view showing a method for displaying the symbol with a color according to the first embodiment of the present invention.

FIG. 18 shows a case in which the color is used as the symbol. In this figure, the shape of the stamp is also shown. However, in a case where the symbol is identified by use of the color as explained in FIG. 7, only the color of the symbol, the number of dots, and the size are used. In this case, ink disappearing after a fixed lapse of time may be also useful.

Figure 19:
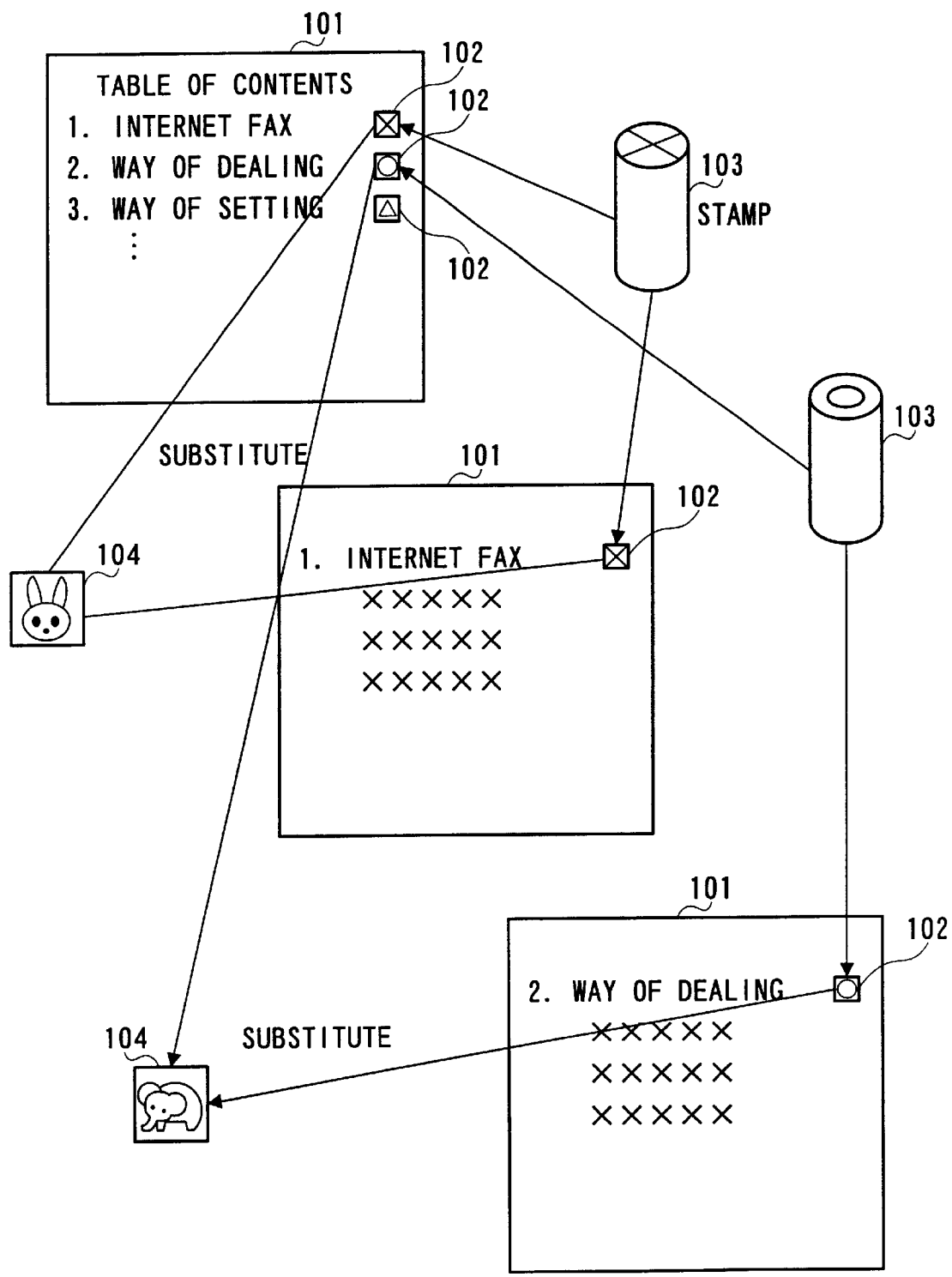
FIG. 19 is a view showing a method for replacing the symbol according to the first embodiment of the present invention.

FIG. 19 shows a case in which the symbol 102 pressed onto the original 101 by the stamp 103 is replaced with another symbol 104, which is built in the apparatus. As the symbol 104 to be replaced, it is better to use the symbols such as an animal, a plant, a star, a heart symbol, etc., which are familiar and well known to the users. This is because the use of such symbols can bring about the easy operation for users and reduction in erroneous operations.

Figure 20:
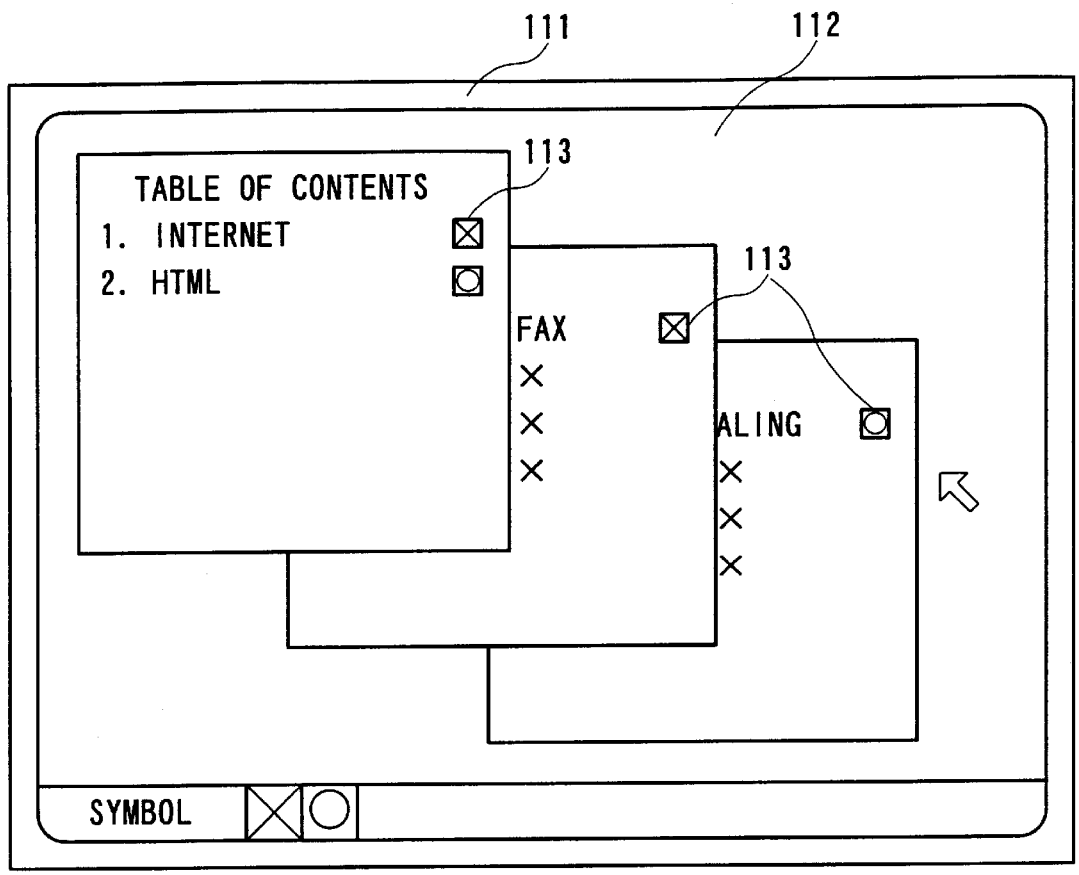
FIG. 20 is a view showing a method for adding the symbol on a screen according to the first embodiment of the present invention.

FIG. 20 shows a case in which the original is scanned as image data without adding the symbol thereto, and is displayed by a display 111, and a symbol 113 is added on a screen 112. This eliminates the need of adding the symbol 113 to the original, so that the original can be prevented from becoming dirty.

Figure 21:
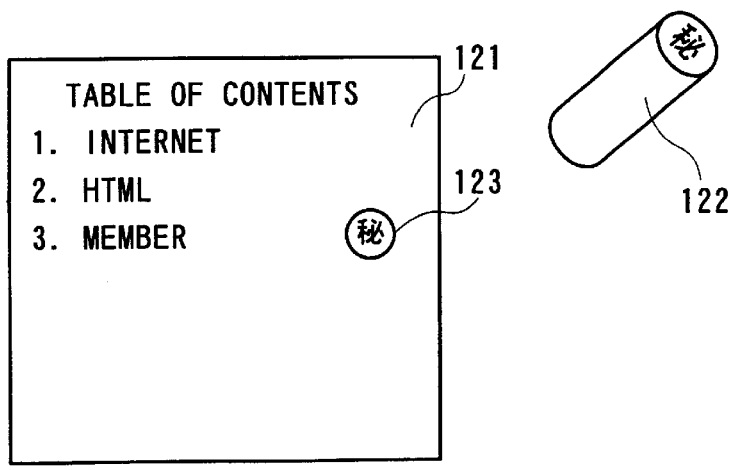
FIG. 21 is a view showing the symbol to which a special meaning is added according to the first embodiment of the present invention.

FIG. 21 shows a case in which a special symbol having a meaning stored in advance is recognized. For example, a symbol 123 showing secrecy such as the so-called "maruhi" is pressed onto a page 122, which is treated as secrecy. Then, the processing of a password request is linked to the symbol 123 so as to create the structured document. When the user clicks the symbol 123 of the previous page 121, the password is first required. Only when the password input by the user is conformed to the stored password, an access to the page including the secret symbol 123 can be obtained.

Figure 22:
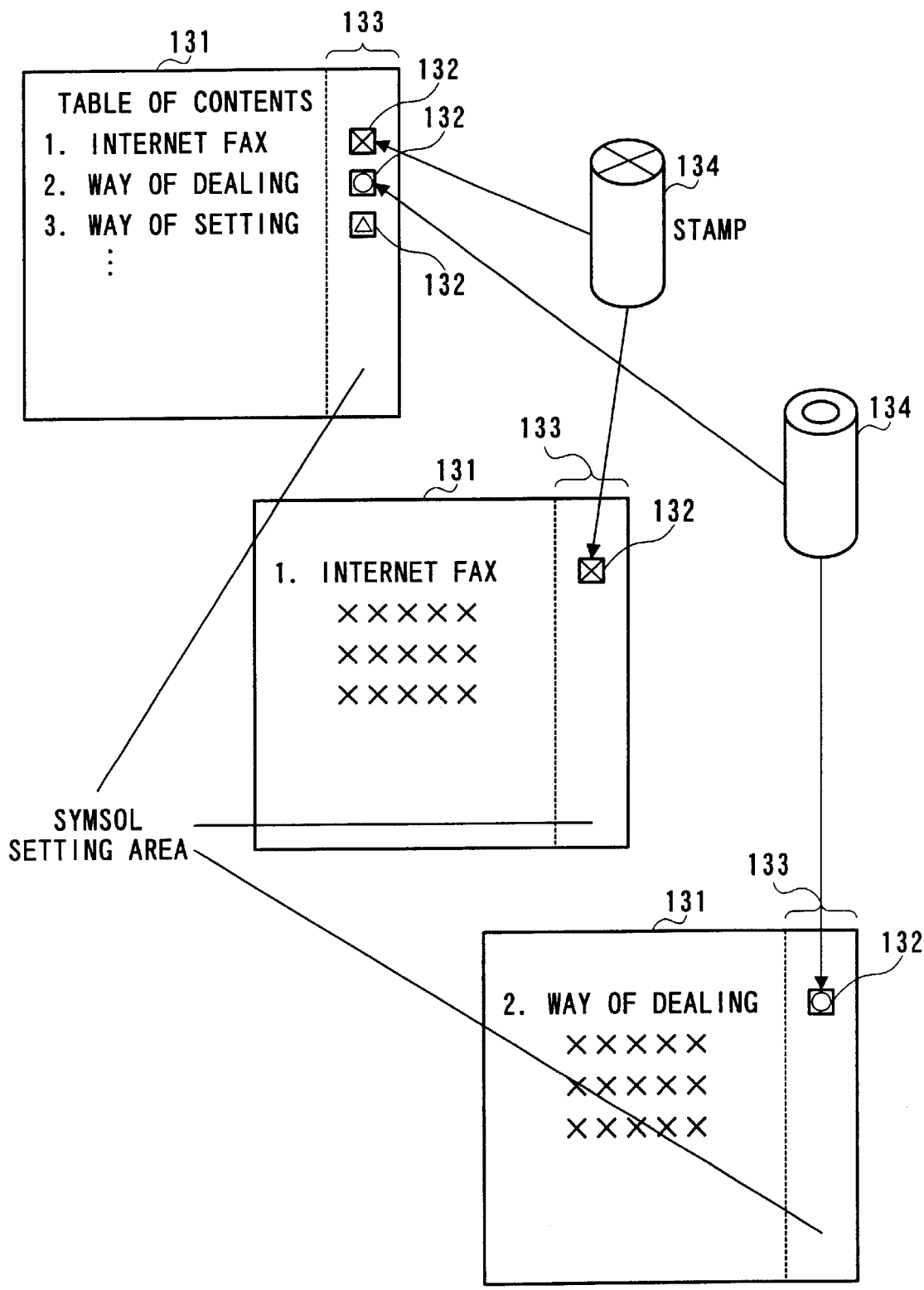
FIG. 22 is a view showing a case in which a special area of the symbol according to the first embodiment of the present invention.

FIG. 22 shows a case in which an area (symbol setting area) 133 for forming a symbol 132 is set in a document 131 in advance. More specifically, the symbol is pressed onto the symbol setting area 133 by a stamp 134. Then, the symbol 132 is extracted from a specific area of the original by the control section 1 and the extracted symbol 132 may only be recognized. As a result, as compared with the case in which the symbol 132 is extracted from the entire surface of the document 131, the accuracy of the symbol recognition and the speed thereof can be improved.

Second Embodiment

The second embodiment will specifically explain a case in which the symbol is recognized by the color.

Figure 23:
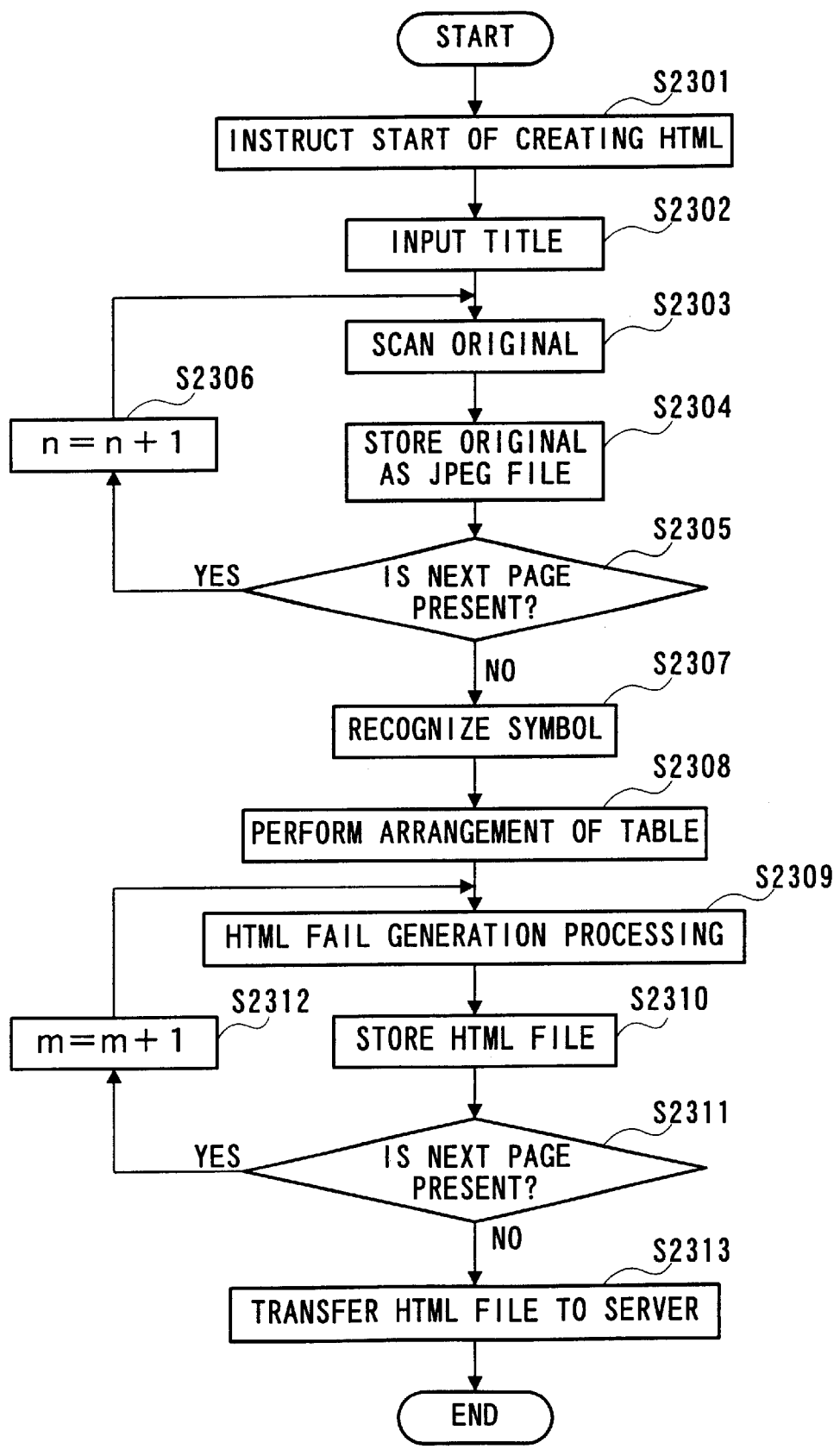
FIG. 23 is a flowchart showing an operation of an entire structured document creating apparatus according to the second embodiment of the present invention.

FIG. 23 is a flowchart showing an operation of the entire structured document creating apparatus according to the second embodiment.

In S2301, an operator designates an operation for creating a home page creation based on HTML using the control panel 3 shown in FIG. 2. In S2302, the operator inputs the title of the home page.

In S2303, the scanner 4 scans the original shown in FIG. 2.

In S2304, the control section 1 shown in FIG. 2 stores the scanned original in a JPEG form. More specifically, the title input in S2302 is used as a file name. Namely, the current number of pages is added to the title and an extension jpg is further added thereto, and this is stored as a file name.

In S2305, it is determined whether or not a next page is present. If the next page is present, the number of pages n is incremented in S2306, the operation goes back to S103, and the next page is scanned. If the next page is not present, the operation goes to S2307.

In S2307, the control section 1 recognizes the symbol included in the JPEG file. Regarding the recognition of the symbol, the central coordinate of the symbol, the radius, and color information are recognized for each page. These recognition results are tabled in a page unit, and stored.

In S2308, the control section 1 performs the arrangement of the table created in S2307. In this case, an isolating symbol having no color information is deleted from the table based on color information. If three or more same symbols are present, an error display is performed.

In S2309, the control section 1 performs an HTML file generation processing. In this case, a file for creating a home page in the HTML is automatically generated.

In S2310, the generated HTML file is stored. More specifically, the number of pages is added to the title input in S2303, an extension htm is further added thereto, and stored. In other words, the file name has a form having the title + the number of pages. htm.

In S2311, it is determined whether or not next page is present. If the next page is present, m is incremented in S2306, and the HTML generation processing is performed again. If the next page is not present, the HTML file generated in S2313 is transferred to the server.

Figure 24:
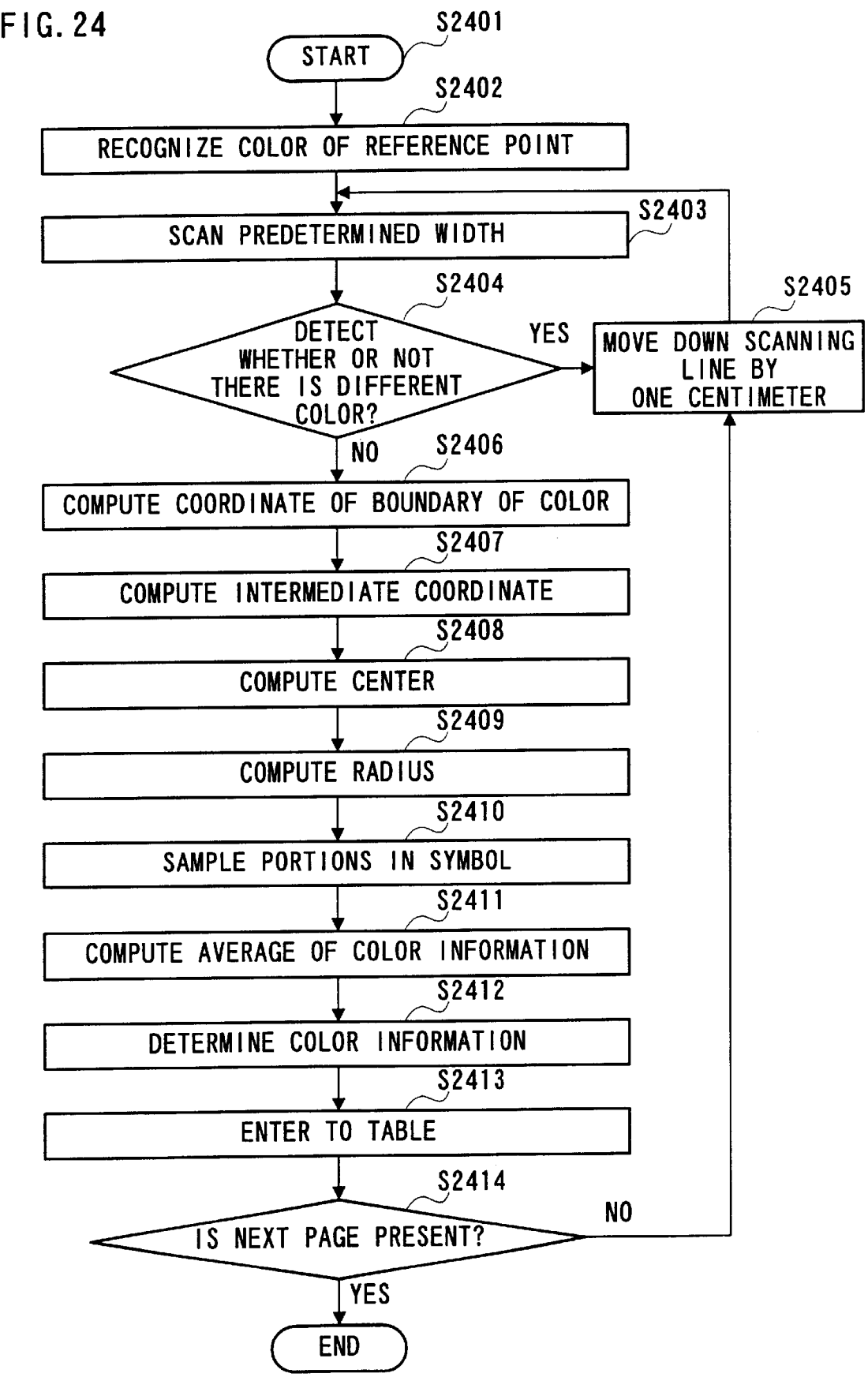
FIG. 24 is a flowchart showing the procedure of a symbol recognition process according to the second embodiment of the present invention.
Figure 25:
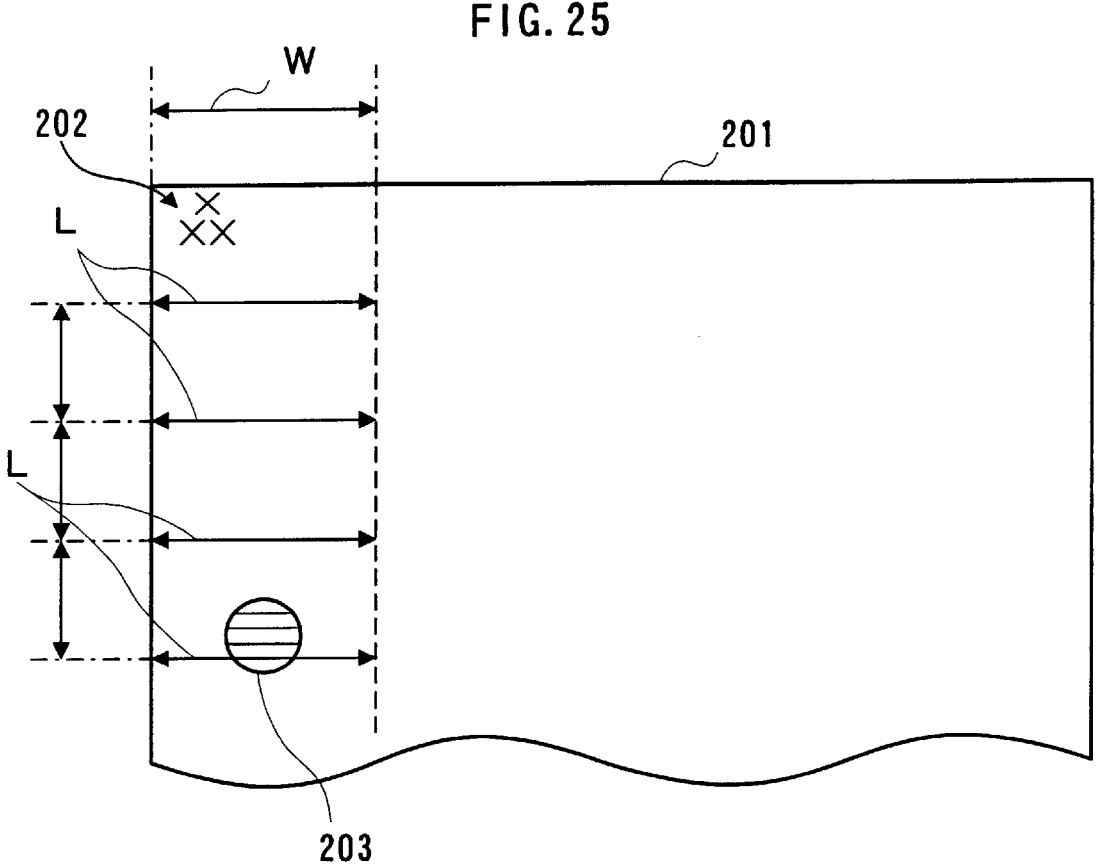
FIG. 25 is a schematic view showing the original in the symbol recognition process according to the second embodiment of the present invention.
Figure 26:
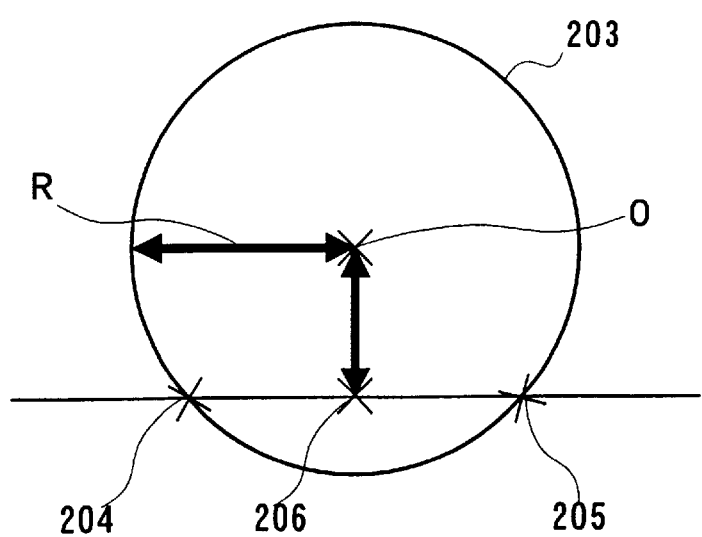
FIG. 26 is an enlarged view showing a part of FIG. 25.

Next, the symbol recognition process of S2307 shown in FIG. 23 will be specifically explained with reference to FIGS. 24 to 26.

First, in S2401, the symbol recognition flow is started.

In S2402, a color of a reference point is recognized. For example, as shown in FIG. 25, points 202 that are placed at an upper left end of an original 201 are sampled, and the sampling results are averaged so as to determine the color of the reference point. A color, which is different from the reference color, is detected based on the color of the reference point. It should be noted that image data to be handled is JPEG data, which is separated into a color space of YcbCr and compressed. The use of the color space of YcbCr can omit the conversion processing, so that the processing can be efficiently performed. Moreover, generally, the recognition, which is similar to the human being, can be performed rather than RGB.

In S2403, a predetermined width is scanned. As shown in FIG. 25, scanning for one line (L) is performed by a predetermined width W. In S2404, it is detected whether or not there is a different color on the scanned line L. If no different color is detected, the operation goes to S2405, the line L is moved down by one centimeter, and the predetermined width W thereof is scanned again.

In order to distinguish the color, the color of the dark portion, that is, the portion ranging from the black to the white, is recognized as the same color, and the subsequent color portion, that is, a light portion is recognized in accordance with shades of gray. This can bring about the recognition, which is similar to the human being.

In S2404, If a different color is detected, that is, the scanning is performed on the symbol 203, the operation goes to S2406. In 2406, the coordinate of each of color boundary points 204 and 205 shown in FIG. 26 is computed. In S2407, a coordinate of an intermediate point 206 between the coordinates of two points is computed.

In S2408, a coordinate of a center O of a circular symbol 203 is computed based on the coordinate of the intermediate point. More specifically, a coordinate where an X-coordinate is fixed and a color changes on a Y-coordinate is searched. Then, a central coordinate is computed based on the searched coordinate.

In S2409, a radius R is computed based on the central coordinate computed in S2408.

In S2410, some portions in the symbol 203 are sampled. In this case, color information having YcrCb is fetched, and a difference in its distribution is checked from each point. In S2411, the average of color information is computed. In S2412, color information is determined based on the computed average value.

In 2413, the coordinate of the symbol, the radius, color information are tabled for each page and entered as shown in FIGS. 27A to 27D.

The above steps explained the processing of one page. In S2414, it is determined whether or not a next page is present. If the next page is present, the operation goes back to S2403. If the next page is not present, the operation is ended. As a result, the recognition of the symbol is performed through all pages of the original, and the managing table of each page is created.

Figure 28:
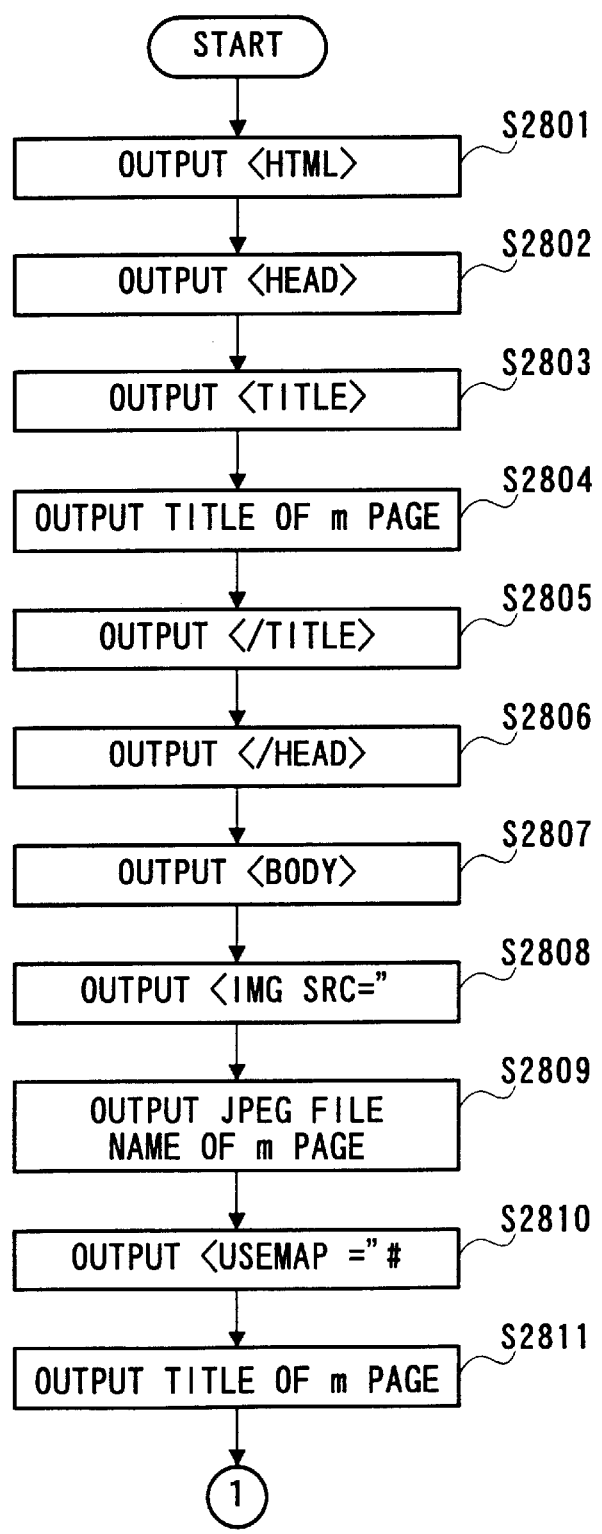
FIGS. 28 to 30 are flowcharts each showing an HTML file generation processing according to the second embodiment of the present invention.
Figure 29:
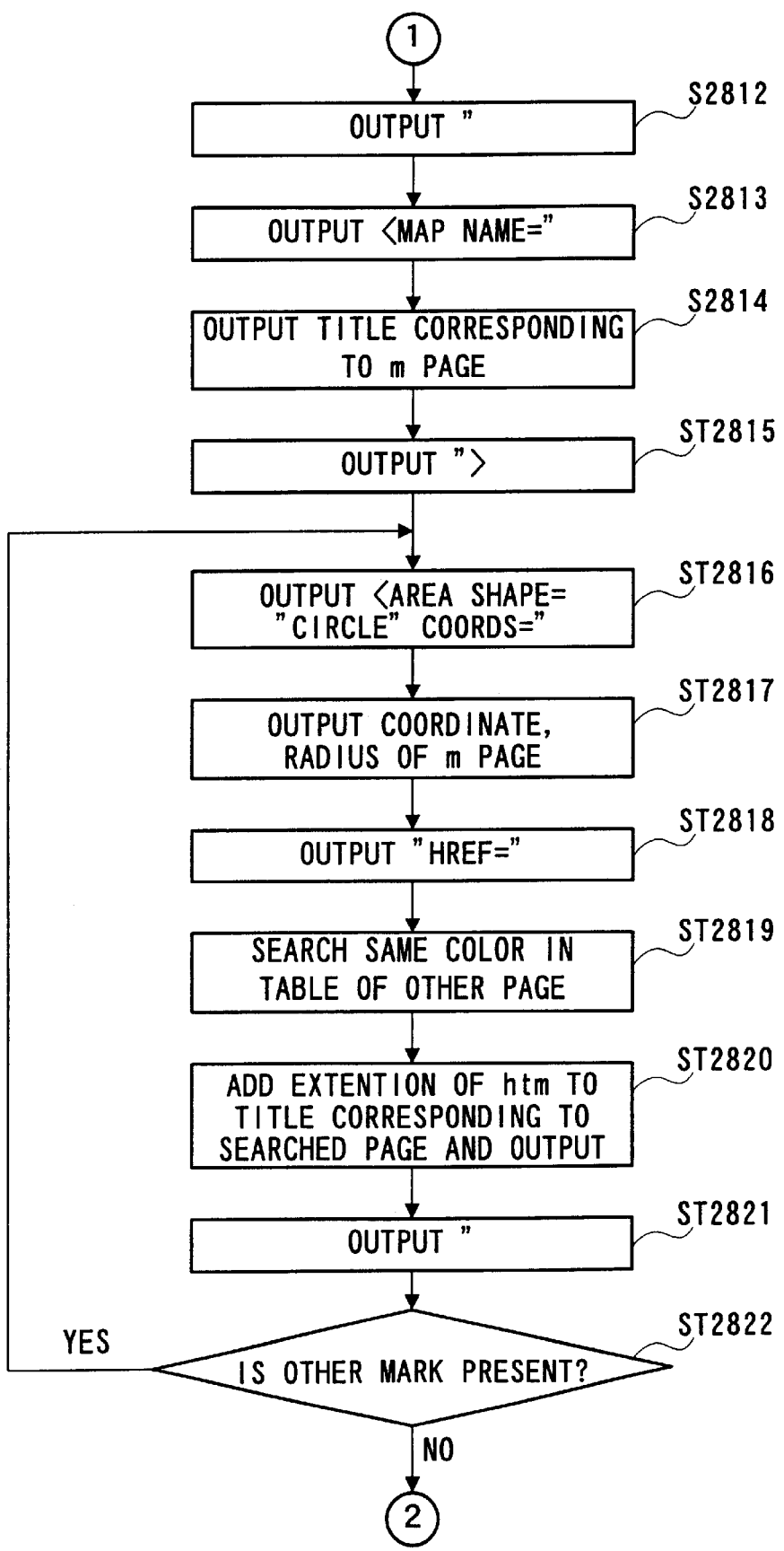
Figure 30:
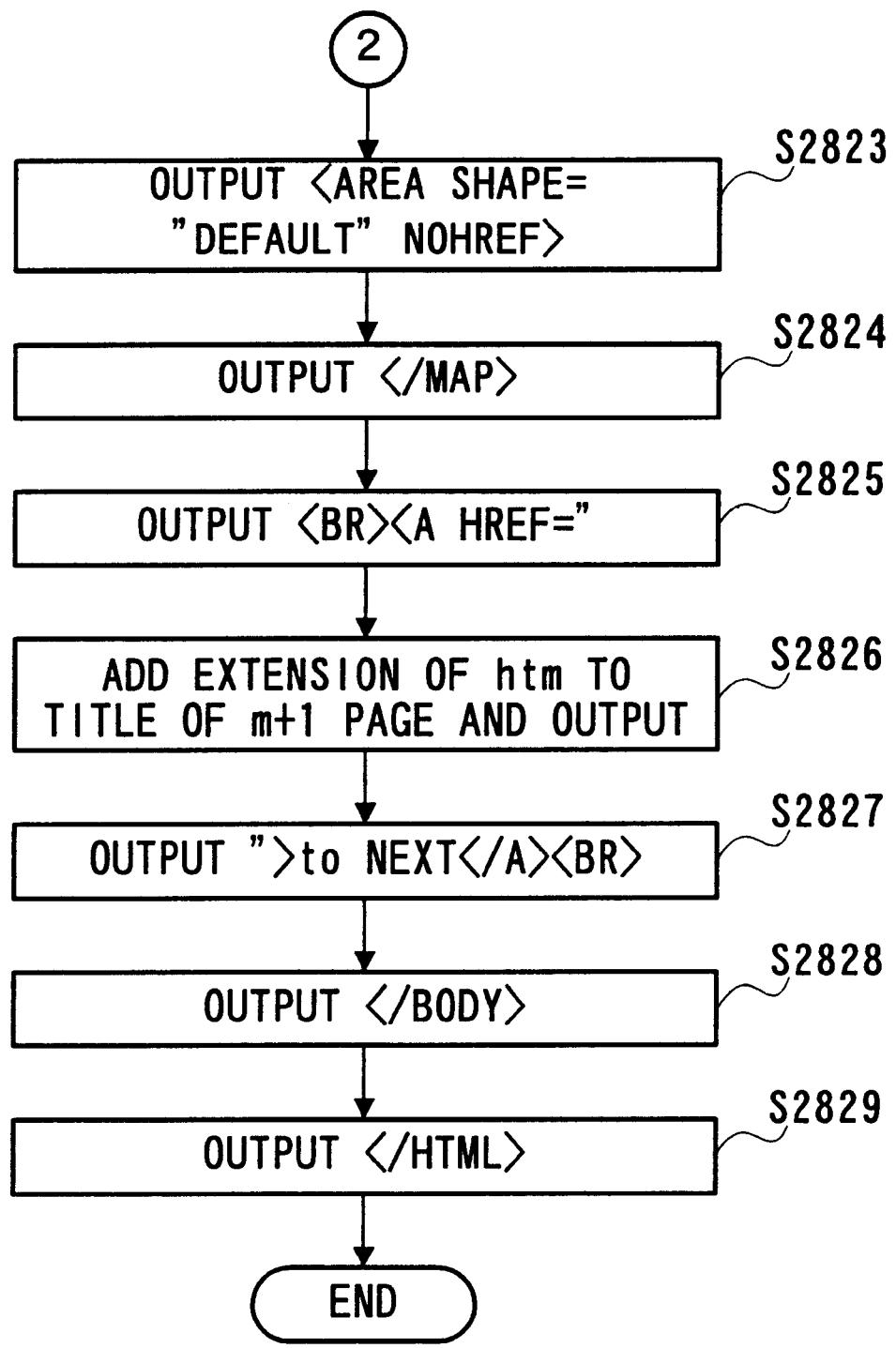

FIGS. 28 to 30 are flowcharts showing the HTML file generation processing in S2309 shown in FIG. 23.

In S2801 to S2803, first to third lines of the HTML file shown in FIG. 31 are sequentially generated.

In S2804, a title name is output using a title input at the original scanning time and its page number. In S2805, </TITLE> is output after the title name.

In S2806 to S2808, fourth to sixth lines of the HTML file shown in FIG. 31 are sequentially generated.

In S2809, the file name of JPG file stored at the original scanning time is output. In S2810, the residue of the sixth line is output. Then, in S2811, the title of m page is output.

In S2812 to S2813 shown in FIG. 29, sixth and seventh lines are generated. In S2814, a title corresponding to the title of the seventh line is output. Actually, the title of m page is output. In S2815, the residue of the seventh line is output.

In S2816, a tag for setting a range to be clicked on the home page is output at an eighth line. In S2817, the central coordinate, which is position information of the symbol, and the radius are output as arguments X, Y, R of the above tag based on the tables shown in FIGS. 27A to 27D.

In S2818, a tag "HREF=" continued from the above arguments is output. In S2819, a link destination is searched using the tables in order to output the link destination. In this case, the searching is performed to detect in which page the table having the same color information is present. In S2820, an extension htm is added to a title corresponding to the searched page, and the title to which the extension htm is added is output. In S2821, the eighth line is closed, and the link destination is generated.

In S2822, it is determined whether or not there is the other symbol in the object table, that is, the table of m page. If there is the other symbol, the operation goes back to S2816, and the processing from S2816 to 2821 is repeated.

In S2823 to S2825 shown in FIG. 30, ninth to eleventh lines of the HTML file shown in FIG. 31 are output and generated. In S2826, information showing a link destination of a next page is output. In S2827, information showing a next page is output. In S2828 and S2829, twelfth and thirteenth lines are output and generated. The HTML file is thus generated.

Figure 32:
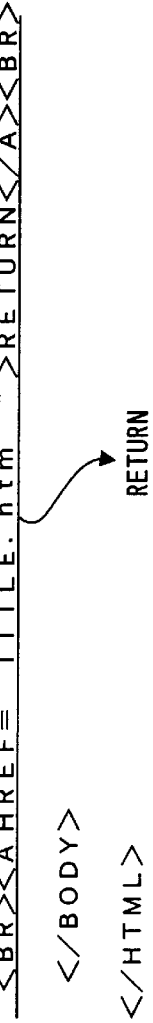

FIG. 32 shows the content of an HTML file having no link destination. The difference between the HTML file of FIG. 31 and that of FIG. 32 is the eleventh line. The eleventh line of the HTML file of FIG. 32 is provided to return to the first page.

Figure 33:
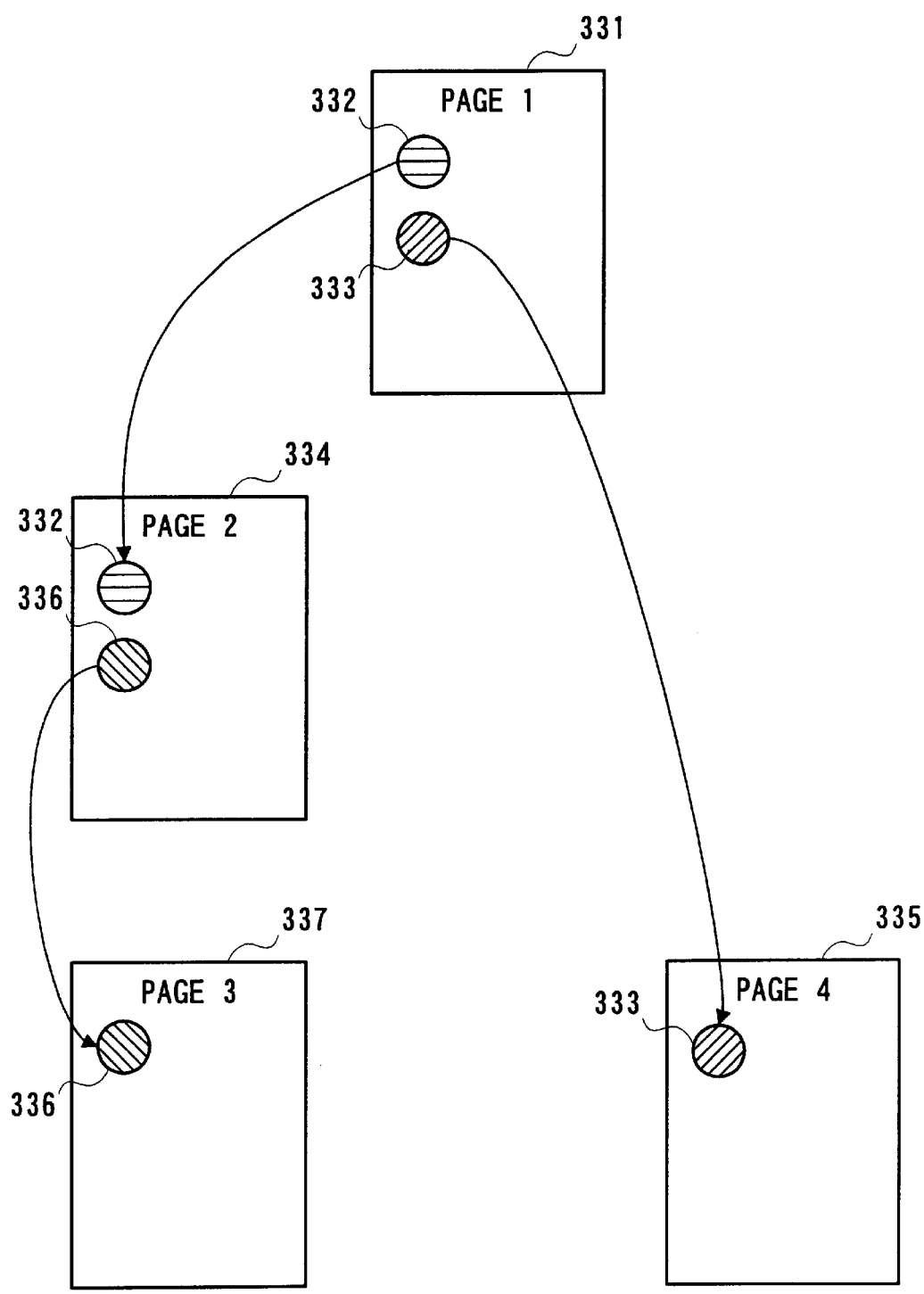
FIG. 33 is a schematic view showing a hierarchical structure of the HTML file generated in the second embodiment of the present invention.

By the HTML file thus generated, the original is hierarchically structured as shown in FIG. 33. More specifically, a first symbol 332 and a second symbol 333, which are contained in a first page 331, have a different color from each other, and are linked to a second page 334 and a fourth page 335, respectively. Therefore, when the first symbol 332 of the first page 331 is clicked, an access to the second page 334 can be obtained, and the second page 334 is displayed. Similarly, when the second symbol 333 is clicked, an access to the fourth page 333 can be obtained. Also, a third symbol 336 contained in the second page 334 is linked to the third page 337. Therefore, when the third symbol 336 of the second page 334 is clicked, an access to the third page 337 can be obtained, and the third page 337 is displayed.

As explained above, according to the structured document creating method in the second embodiment, the existing document described in the paper original using the symbols each having a different color can be easily converted to the HTML document.

Third Embodiment

Next, the third embodiment of the present invention will be explained. The third embodiment explains a case in which a symbol is deleted from image data having the symbol stored in the image storing section 6 of FIG. 2, and printed. Image data stored in the image storing section 6 is one that has been scanned by the scanner 4 or one that has been received by facsimile communications in the communication section 2.

Figure 34:
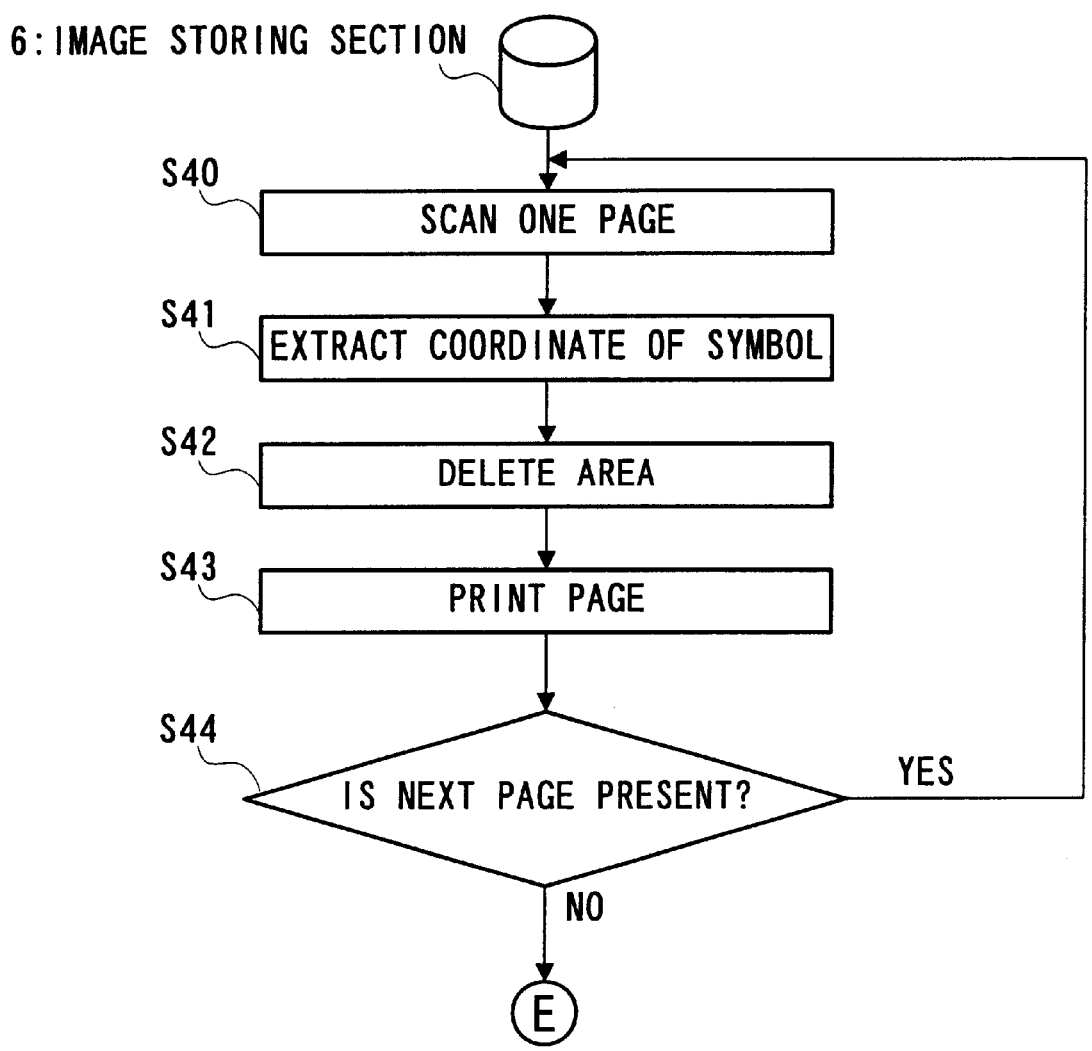
FIG. 34 is a flowchart an operation of the structured document creating apparatus when no symbol is printed according to the third embodiment of the present invention.

FIG. 34 is the flowchart showing the operation in the third embodiment. A first page of image data to be printed is scanned by the image storing section 6 (S40). Next, a coordinate point of the symbol is extracted (S41), and data of a symbol existing area is deleted (S42). After the deletion, the printing of the page is performed (S43). Then, it is checked whether or not a next page is present (S44). If the next page is present, the operations in steps S40 to S43 are repeated up to the final page. Thus, the print of the original having no symbol added can be obtained.

Fourth Embodiment

Next, the fourth embodiment of the present invention will be explained. The fourth embodiment explains a method for determining the symbol without fail even in a case where there is a difficulty in determining the symbol because the symbol is overlapped with the original character and picture portion. In the third embodiment, image data is stored in the image storing section 6 in a state that no symbol is added thereto. For example, as explained in FIG. 20, image data is displayed on the screen, and the symbol is added thereto. Thereafter, the recognition of the symbol and the confirmation of the position are performed, and the structured document creating procedure is started.

Figure 35:
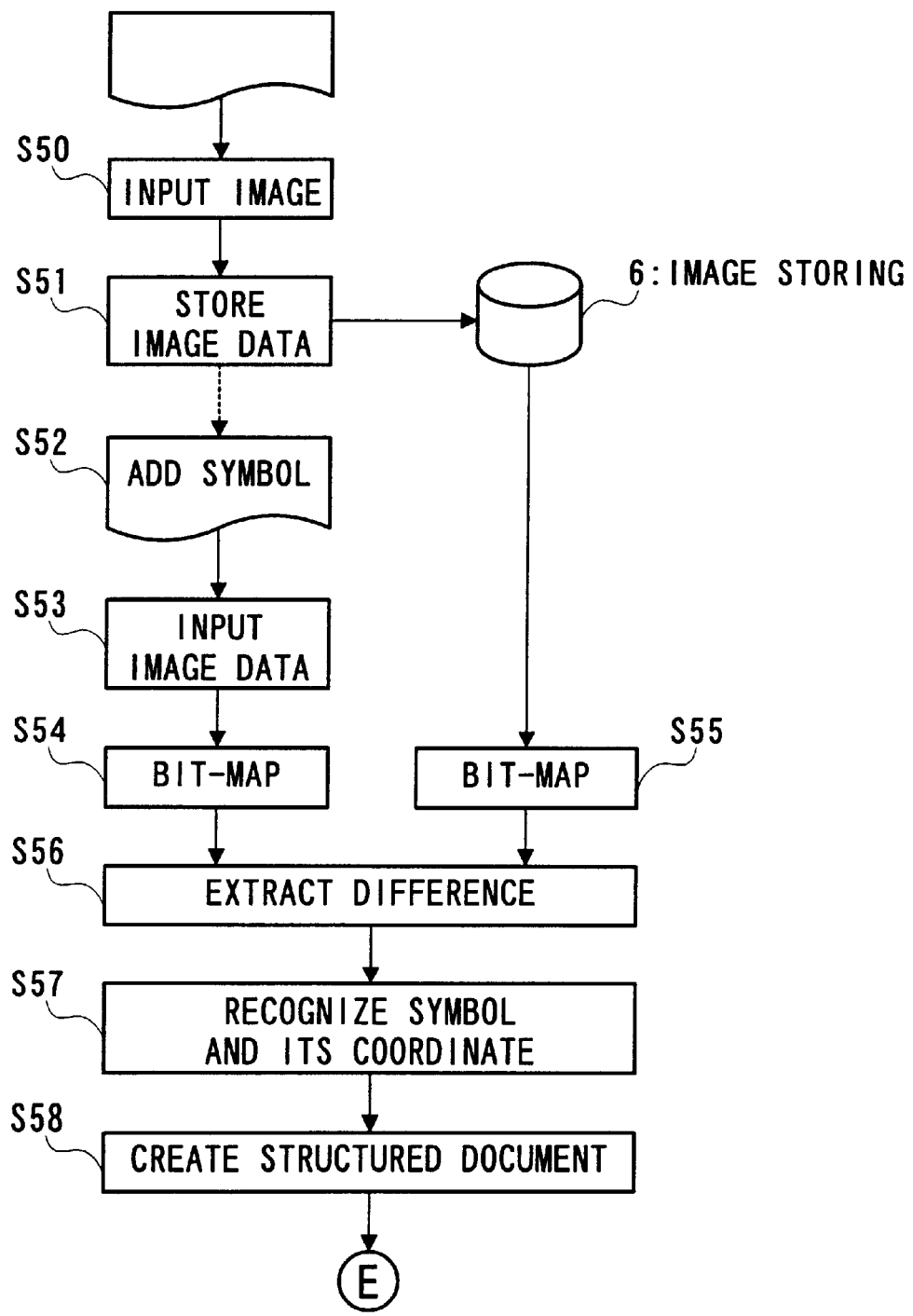
FIG. 35 is a flowchart showing an operation of obtaining a difference between image data to which the symbol is added and image data to which no symbol is added in the same page so as to detect the symbol without fail according to the fourth embodiment of the present invention.

FIG. 35 is a flowchart showing an operation of the fourth embodiment (S50). Image data can be obtained by scanning from the scanner 4 or the facsimile reception. Input data is stored in the image storing section 6 (S51). Stored image data is read, and the symbol is added thereto by the above-mentioned method (S52). Then, image data is input again (S53), and is bit-mapped (S54). On the other hand, image data having no symbol added is read from the image storing section 6 so as to be bit-mapped (S55). A difference between bit-mapped image data having the symbol added and bit-mapped image data having no symbol added is extracted so as to extract only the symbol without fail (S56). The extracted symbol and the coordinate are recognized (S57), and the structured document creating procedure is started (S58). According to this embodiment, even if the symbol is overlapped with the original character and picture portion, the symbol can be recognized accurately.

The aforementioned first to fourth embodiments explained the case in which image data was linked to the symbol. However, the following method can be used. More specifically, the symbol and the document included in the title original corresponding to the symbol can be recognized by the OCR apparatus. Then, the relevant page is tabled so as to be made to correspond to the symbol, and described in the HTML, whereby making it possible to create the structured document.

Fifth Embodiment

Next, the fifth embodiment of the present invention will be explained. The fifth embodiment relates to the document creating apparatus for creating a document with a voice code and its method.

Figure 36:
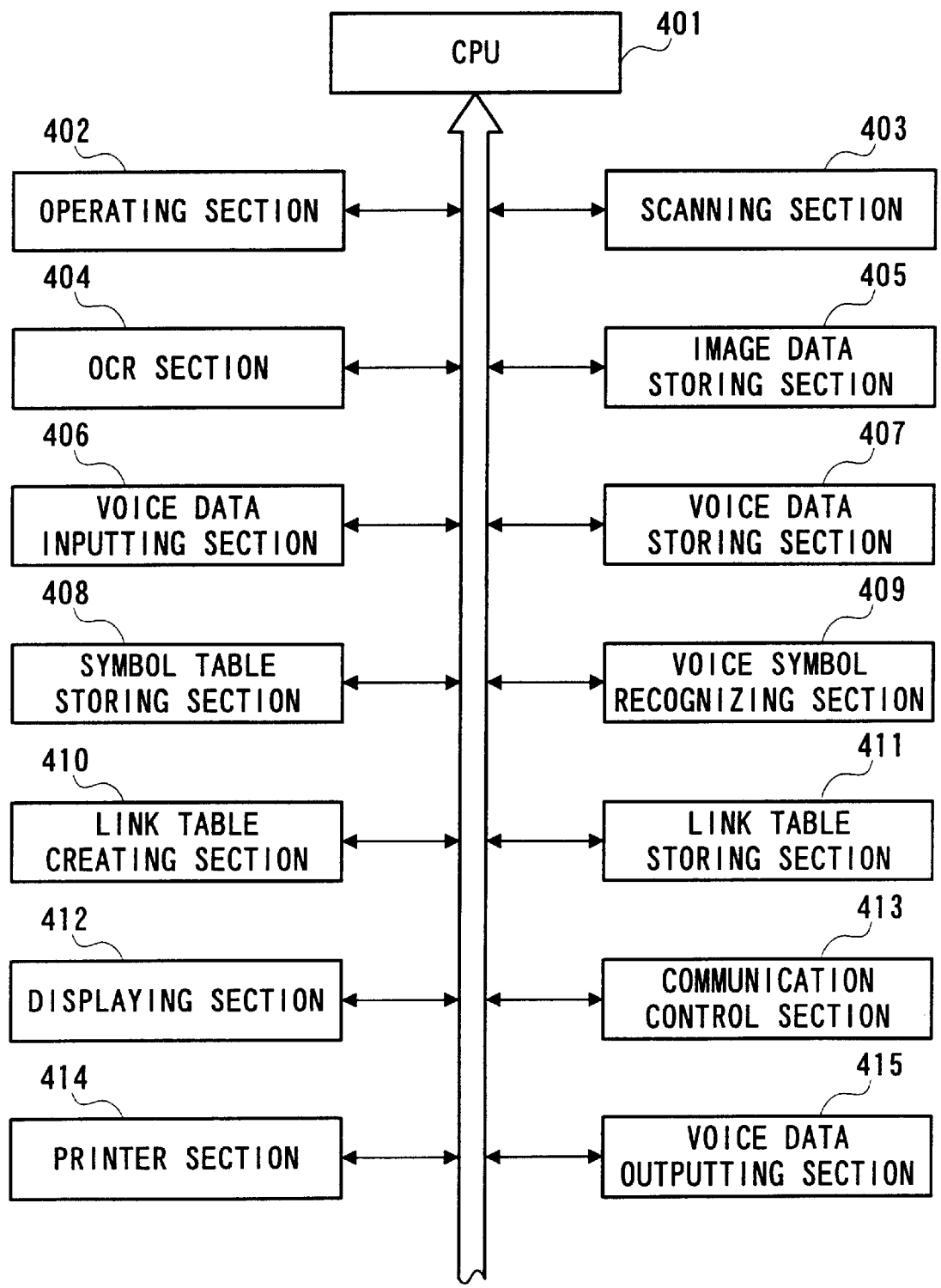
FIG. 36 is a block diagram showing the structure of the apparatus for creating the document with voice data according to the fifth embodiment of the present invention.

FIG. 36 is a block diagram showing the structure of the document creating apparatus for creating a document with voice data according to this embodiment.

As shown in FIG. 36, the document creating apparatus for creating a document with voice data comprises a CPU (Central Processing Unit) 401, an input section 402, a scanner 403, an OCR section 404, and an image data storing section 405. The CPU 401 controls each circuit. The input section 402 includes a keyboard and a mouse by which the user inputs various instructions. The scanner 403 scans the document as image data. The OCR section 404 recognizes the characters from scanned image data. The image data storing section 405 stores image data scanned by the scanner 403. The above-structured document creating apparatus fetches an original having a voice symbol added in advance such that a document with voice data can be created based on the original.

The document creating apparatus for creating a document with voice data further comprises a voice inputting section 406 for inputting voice data and a voice data storing section 407 for storing voice data input from the voice inputting section 406. Voice data to be added to the image can be fetched, and stored in the voice data storing section 407.

The method for inputting voice data includes an inputting method using a microphone, and a method for inputting voice data from a telephone apparatus attached. It should be noted that voice data is stored in the file format. If an extension for a file name of voice data is determined as "WAV" in advance, the later processing and management can be easily executed.

The document creating apparatus for creating a document with voice data further comprises a symbol table storing section 408 for storing voice symbols. The voice symbol corresponding to voice data can be stored in the symbol table.

FIG. 37 is a view showing the symbol table in the symbol table storing section 408. As shown in FIG. 37, shapes of the respective voice symbols and file names of voice data linking thereto are entered into the symbol table so as to correspond to each other. It should be noted that the voice symbols be expressed by the colors other than the shapes. In a case where a new voice symbol is entered into the symbol table, the new voice symbol is entered into the symbol table storing section 408 together with the file name corresponding to the new voice symbol.

The voice symbols are entered by a different file name for each kind of voice data to be entered. For example, the file name of voice data of musical instruments is set to MUSIC, that of voice data of songs is set to SONG, and that of voice data of narration is set to VOICE. The voice symbols each having a different shape for each kind of voice data are made to correspond to the file names, so that the kind of the corresponding voice data can be recognized by the voice symbol on the screen.

The document creating apparatus for creating a document with voice data further comprises a voice symbol recognizing section 409, a link table creating section 410, a link table storing section 411. The voice symbol recognizing section 409 recognizes the voice symbol displayed on each page of the original. The link table creating section 410 creates a link table for linking the voice symbol to the position of each page of the original and voice data. The link table storing section 411 stores the created link table. Then, input image data and voice data are linked to each other, so that the document with voice data can be created.

FIG. 38 is a view showing the link table in the link table storing section 411. As shown in FIG. 38, the shape of each voice symbol, the file name of linking image data, the position of each voice symbol in image data, and the file name of linking voice data are entered into the link table to correspond to each other. In this embodiment, the position of the voice symbol is expressed by the central coordinate of the symbol and a radius of a circle with a size where the symbol can enter. However, the position of the voice symbol can be expressed by the other parameters.

The document creating apparatus for creating a document with voice data further comprises display means 412, a communication control section 413, a printer section 414, and a voice data outputting section 415. The display means 412 displays the image on the screen. The communication control section 413 is connected to the network, and controls the network communications such as facsimile communications, Internet. The printer section 414 prints reception information and image data scanned by the scanner 402. The voice data outputting section 415 reproduces voice data. The above-structured document creating apparatus can provide various processings, e.g., receiving and transmitting from/to the other information apparatuses, outputting, and reproducing, to the created document with voice data. Also, the corresponding voice data is reproduced by clicking each voice symbol on the screen using the mouse, so that an acoustic service can be provided in addition to the visual service. This can improve operability.

In a case where created image data is transmitted, added voice data and the link table are transmitted as an appended file together with image data. This can also reproduce voice data at the transmission destination.

Next, the following will explain the processing for creating the document with voice data by use of the document creating apparatus for creating a document with voice data of the fifth embodiment.

Figure 39:
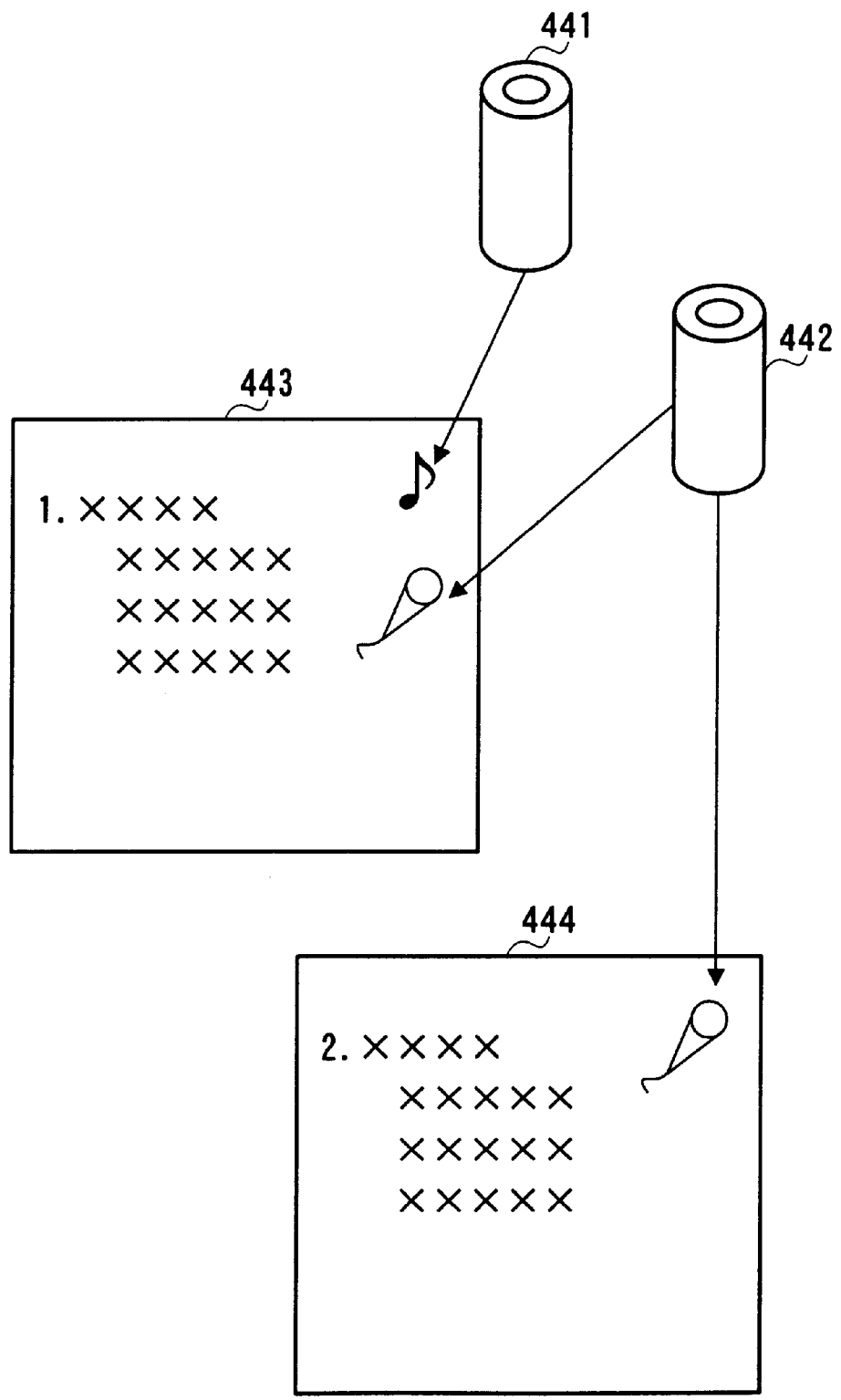
FIG. 39 is a view showing the original to which a voice symbol is added according to the fifth embodiment of the present invention.

First of all, as a precondition of creating the document with voice data, voice symbols are added to the necessary portions of the original by use of stamps. FIG. 39 is a view showing an example of the originals to which the voice symbols are added according to the fifth embodiment. As shown in FIG. 39, the same number of voice symbols can be easily added to the originals 443 and 444 by use of stamps 441 and 442. At this time, the shape of the voice symbol is changed, depending on the kind of voice data to be entered such as the musical instrument, song, narration. As a method for adding the voice symbol to the original, there is a method using a seal pasting other than the method using the stamp.

Figure 40:
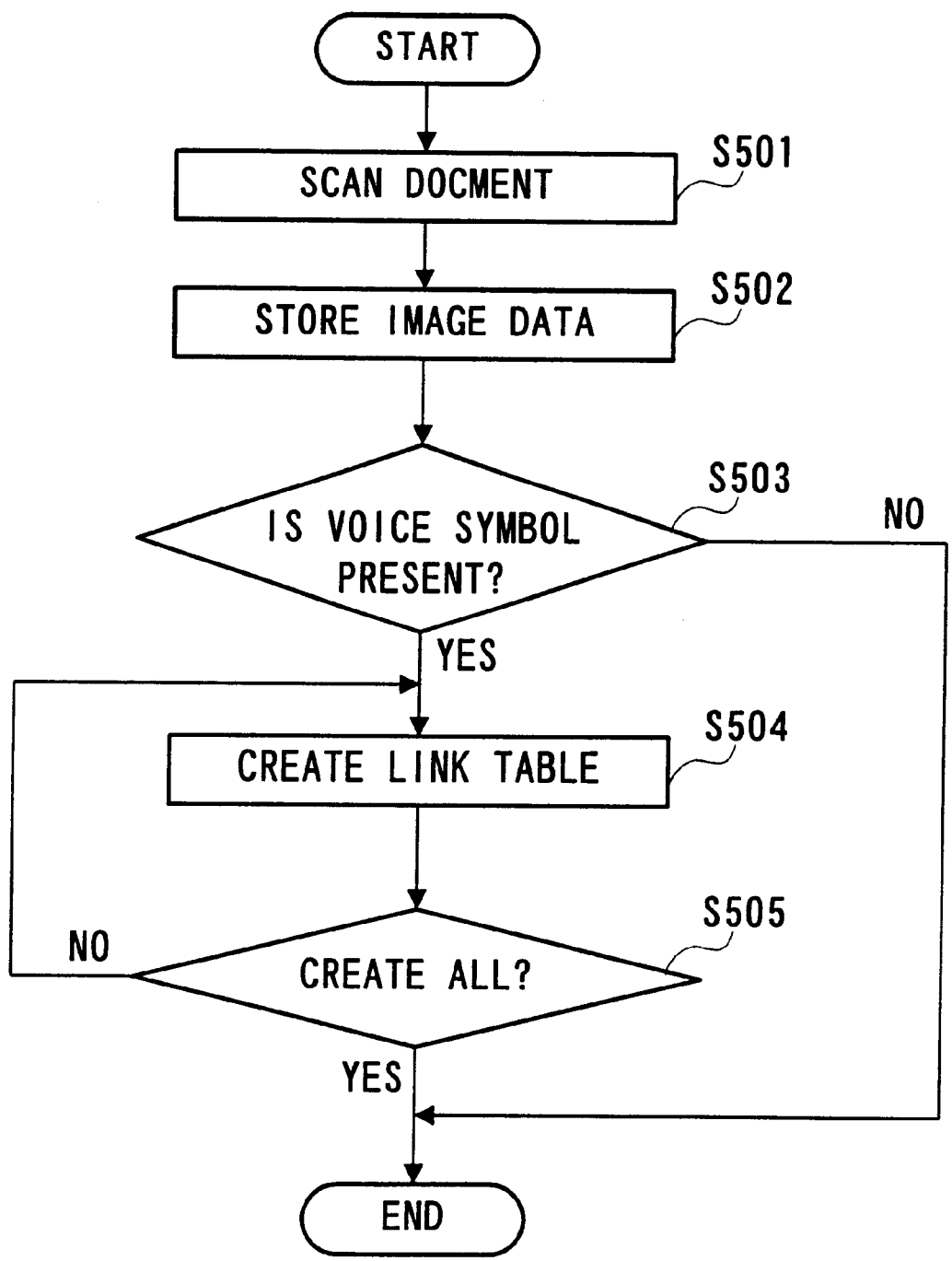
FIG. 40 is a flowchart showing the flow of the creation processing of the document with voice data according to the fifth embodiment of the present invention.

Next, the following will explain the flow of the creation processing of the document with voice data in the fifth embodiment with reference to FIG. 40. FIG. 40 is a flowchart showing the flow of the creation processing of the document with voice data according to the fifth embodiment.

First of all, the originals to which the voice symbols are added are scanned from the scanner 3 (S501).

The scanned originals are sequentially stored in the image data storing section 405 as image data (S502). Scanned image data is separated into areas, and the document in the original is character recognized by the OCR section 404, and fetched as image.

Next, the voice symbol recognizing section 409 recognizes whether or not stored image data has the voice symbol having the same shape as the voice symbol entered in the symbol table storing section 408 (S503). If the voice symbol having the same shape as the voice symbol entered in the symbol table storing section 408 is not recognized, scanned image data is regarded as normal image data having no voice data, and the processing is ended.

If the voice symbol is recognized, the voice symbol is written to the link table together with the position of each page of the original and the name of the linking voice data file in the link table creating section 410 (S504)

If a plurality of voice symbols is recognized, the link tables are created to all voice symbols (S505).

The document with voice data can be created by the above-explained processing. Also, if the voice symbol is pasted to the original in advance and scanned, the user does not have to perform the other operations.

The created document with voice data is displayed on the screen, and the voice symbol is clicked by use of the mouse, whereby reproducing voice data such as the corresponding musical instrument, song, and narration.

The created document with voice data is subjected to various processings such as receiving and transmitting from/to the other information apparatuses, outputting, and reproducing by use of the communication control section 413, the printer section 414, and the voice data outputting section 415.

As explained above, the present invention can provide an apparatus for easily creating a document with voice data for a short period of time even if the large number of voice symbols is present, and can provide its method using such an apparatus.

The above first to fifth embodiments took the facsimile apparatus having the document creating function as an example. However, the present invention is not limited to such an example. Namely, the present invention can be applied to a personal computer to which an outer scanner is connected, and an Internet terminal. Industrial Applicability Thus, the structured document creating apparatus according to the present invention is useful for the facsimile apparatus, and is particularly suitable for converting the existing document to the structured document.

What is claimed is:

1. A structured document creating apparatus comprising:
   an input section that inputs image data in a plurality of originals in sequence from an earlier original to a later original, each original having a symbol in a predetermined area of each original, only a symbol being contained in the predetermined area;
   a symbol recognizing section that recognizes an attribute of the symbol only in the predetermined area of each original;
   a judging section that judges whether the symbol having the same attribute as the recognized symbol is present in a symbol table;
   a table creating section that, when the symbol having the same attribute as the recognized symbol is not present in the symbol table, stores the recognized symbol in the symbol table, that stores, when the symbol having the same attribute as the recognized symbol is present in the symbol table, a first link information in the symbol table, and that stores, when the original being processed is not a first original of the plurality of originals, a second link information in the symbol table, and
   a document creating section that creates a structured document described in Hyper Text Marked Language (HTML) based on the symbol table so that the image data of each page is linked based on the first link information and second link information;
   wherein the first link information relates an earlier original having the recognized symbol to a later original having the recognized symbol, the second link information relates a later original to an earlier original.

2. The apparatus according to claim 1, said symbol recognizing section recognizes a color as the attribute of the symbol.

3. The apparatus according to claim 1, wherein said symbol recognizing section detects a symbol having a color different from the color of the original, and recognizes the detected color.

4. The apparatus according to claim 1, said symbol recognizing section recognizes a shape as the attribute of the symbol.

5. The apparatus according to claim 1, the original having a plurality of symbols.

6. The apparatus according to claim 1, further comprising:
   a symbol deleting section that deletes at least one symbol included in the image data; and
   a printing section that prints the image data without the symbol.

7. The apparatus according to claim 6, wherein stamp liquid disappears after a lapse of a predetermined time after use of the stamp.

8. The apparatus according to claim 1, further comprising a symbol replacing section that replaces the symbol recognized by said symbol recognizing section with an other symbol stored in advance to correspond to the symbol recognized by said symbol recognizing section.

9. The apparatus according to claim 1, wherein the symbol is formed by contacting the original with a symbol stamp.

10. The apparatus according to claim 1, wherein the symbol is formed by pasting a seal having the symbol onto the original.

11. A communication apparatus comprising:
    an input section that inputs image data in a plurality of originals in sequence from an earlier original to a later original, each original having a symbol in a predetermined area of each original, only a symbol being contained in the predetermined area;
    a symbol recognizing section that recognizes an attribute of the symbol only in the predetermined area of each original;
    a judging section that judges whether the symbol having the same attribute as the recognized symbol is present in a symbol table;
    a table creating section that, when the symbol having the same attribute as the recognized symbol is not present in the symbol table, stores the recognized symbol in the symbol table, that stores, when the symbol having the same attribute as the recognized symbol is present in the symbol table, a first link information in the symbol table, and that stores, when the original being processed is not a first original of the plurality of originals, a second link information in the symbol table;
    a document creating section that creates a structured document described in Hyper Text Marked Language (HTML) based on the symbol table so that the image data of each page is linked based on the first link information and second link information, and
    a transmitting section that transmits the structured document;
    wherein the first link information relates an earlier original having the recognized symbol to a later original having the recognized symbol, the second link information relates a later original to an earlier original.

12. A structured document creating method comprising the step of:
    inputting image data in a plurality of originals in sequence from an earlier original to a later original, each original having a symbol in a predetermined area of each original, only a symbol being contained in the predetermined area;
    recognizing an attribute of the symbol only in the predetermined area of each original;
    judging whether the symbol having the same attribute as the recognized symbol exists in a symbol table;
    storing, when the symbol having the same attribute as the recognized symbol does not exist in the symbol table, the recognized symbol in the symbol table;
    storing, when the symbol having the same attribute as the recognized symbol exists in the symbol table, a first link information in the symbol table, the first link information indicating an earlier original having the recognized symbol being linked to an original being processed having the recognized symbol;
    storing, when the original being processed is not a first page original, a second link information in the symbol table, the second link information indicating the original being processed being linked to an earlier original; and
    creating a structured document described in Hyper Text Marked Language (HTML) based on the first link information and the second link information.

* * * * *